United States Patent
Shalvi et al.

(10) Patent No.: US 8,479,080 B1
(45) Date of Patent: Jul. 2, 2013

(54) ADAPTIVE OVER-PROVISIONING IN MEMORY SYSTEMS

(75) Inventors: Ofir Shalvi, Ra'anana (IL); Naftali Sommer, Rishon Lezion (IL); Yoav Kasorla, Seoul (KR)

(73) Assignee: Apple Inc., Cupertino, CA (US)

( * ) Notice: Subject to any disclaimer, the term of this patent is extended or adjusted under 35 U.S.C. 154(b) by 428 days.

(21) Appl. No.: 12/822,207

(22) Filed: Jun. 24, 2010

Related U.S. Application Data

(60) Provisional application No. 61/224,897, filed on Jul. 12, 2009, provisional application No. 61/293,814, filed on Jan. 11, 2010, provisional application No. 61/334,606, filed on May 14, 2010.

(51) Int. Cl.
*H03M 13/00* (2006.01)

(52) U.S. Cl.
USPC ........... 714/774; 714/763; 714/773; 714/799; 714/52; 714/766; 711/103; 711/170; 711/206; 711/203; 365/185.09

(58) Field of Classification Search
None
See application file for complete search history.

(56) References Cited

U.S. PATENT DOCUMENTS

| | | |
|---|---|---|
| 3,668,631 A | 6/1972 | Griffith et al. |
| 3,668,632 A | 6/1972 | Oldham |
| 4,058,851 A | 11/1977 | Scheuneman |
| 4,112,502 A | 9/1978 | Scheuneman |
| 4,394,763 A | 7/1983 | Nagano et al. |
| 4,413,339 A | 11/1983 | Riggle et al. |
| 4,556,961 A | 12/1985 | Iwahashi et al. |
| 4,558,431 A | 12/1985 | Satoh |
| 4,608,687 A | 8/1986 | Dutton |
| 4,654,847 A | 3/1987 | Dutton |
| 4,661,929 A | 4/1987 | Aoki et al. |
| 4,768,171 A | 8/1988 | Tada |
| 4,811,285 A | 3/1989 | Walker et al. |
| 4,899,342 A | 2/1990 | Potter et al. |
| 4,910,706 A | 3/1990 | Hyatt |
| 4,993,029 A | 2/1991 | Galbraith et al. |
| 5,056,089 A | 10/1991 | Furuta et al. |
| 5,077,722 A | 12/1991 | Geist et al. |

(Continued)

FOREIGN PATENT DOCUMENTS

| | | |
|---|---|---|
| EP | 0783754 B1 | 7/1997 |
| EP | 1434236 B1 | 6/2004 |

(Continued)

OTHER PUBLICATIONS

Hong et al., "NAND Flash-based Disk Cache Using SLC/MLC Combined Flash Memory", 2010 International Workshop on Storage Network Architecture and Parallel I/Os, pp. 21-30, USA, May 3, 2010.

(Continued)

*Primary Examiner* — John Trimmings
(74) *Attorney, Agent, or Firm* — Meyertons, Hood, Kivlin, Kowert & Goetzel, P.C.

(57) ABSTRACT

A method for data storage includes, in a memory that includes multiple memory blocks, specifying at a first time a first over-provisioning overhead, and storing data in the memory while retaining in the memory blocks memory areas, which do not hold valid data and whose aggregated size is at least commensurate with the specified first over-provisioning overhead. Portions of the data from one or more previously-programmed memory blocks containing one or more of the retained memory areas are compacted. At a second time subsequent to the first time, a second over-provisioning overhead, different from the first over-provisioning overhead, is specified, and data storage and data portion compaction is continued while complying with the second over-provisioning overhead.

54 Claims, 5 Drawing Sheets

U.S. PATENT DOCUMENTS

| | | | |
|---|---|---|---|
| 5,126,808 A | 6/1992 | Montalvo et al. |
| 5,163,021 A | 11/1992 | Mehrotra et al. |
| 5,172,338 A | 12/1992 | Mehrotta et al. |
| 5,182,558 A | 1/1993 | Mayo |
| 5,182,752 A | 1/1993 | DeRoo et al. |
| 5,191,584 A | 3/1993 | Anderson |
| 5,200,959 A | 4/1993 | Gross et al. |
| 5,237,535 A | 8/1993 | Mielke et al. |
| 5,272,669 A | 12/1993 | Samachisa et al. |
| 5,276,649 A | 1/1994 | Hoshita et al. |
| 5,287,469 A | 2/1994 | Tsuboi |
| 5,365,484 A | 11/1994 | Cleveland et al. |
| 5,388,064 A | 2/1995 | Khan |
| 5,416,646 A | 5/1995 | Shirai |
| 5,416,782 A | 5/1995 | Wells et al. |
| 5,446,854 A | 8/1995 | Khalidi et al. |
| 5,450,424 A | 9/1995 | Okugaki et al. |
| 5,469,444 A | 11/1995 | Endoh et al. |
| 5,473,753 A | 12/1995 | Wells et al. |
| 5,479,170 A | 12/1995 | Cauwenberghs et al. |
| 5,508,958 A | 4/1996 | Fazio et al. |
| 5,519,831 A | 5/1996 | Holzhammer |
| 5,532,962 A | 7/1996 | Auclair et al. |
| 5,533,190 A | 7/1996 | Binford et al. |
| 5,541,886 A | 7/1996 | Hasbun |
| 5,600,677 A | 2/1997 | Citta et al. |
| 5,638,320 A | 6/1997 | Wong et al. |
| 5,657,332 A | 8/1997 | Auclair et al. |
| 5,675,540 A | 10/1997 | Roohparvar |
| 5,682,352 A | 10/1997 | Wong et al. |
| 5,687,114 A | 11/1997 | Khan |
| 5,696,717 A | 12/1997 | Koh |
| 5,726,649 A | 3/1998 | Tamaru et al. |
| 5,726,934 A | 3/1998 | Tran et al. |
| 5,742,752 A | 4/1998 | De Koening |
| 5,748,533 A | 5/1998 | Dunlap et al. |
| 5,748,534 A | 5/1998 | Dunlap et al. |
| 5,751,637 A | 5/1998 | Chen et al. |
| 5,761,402 A | 6/1998 | Kaneda et al. |
| 5,798,966 A | 8/1998 | Keeney |
| 5,799,200 A | 8/1998 | Brant et al. |
| 5,801,985 A | 9/1998 | Roohparvar et al. |
| 5,838,832 A | 11/1998 | Barnsley |
| 5,860,106 A | 1/1999 | Domen et al. |
| 5,867,114 A | 2/1999 | Barbir |
| 5,867,428 A | 2/1999 | Ishii et al. |
| 5,867,429 A | 2/1999 | Chen et al. |
| 5,877,986 A | 3/1999 | Harari et al. |
| 5,889,937 A | 3/1999 | Tamagawa |
| 5,901,089 A | 5/1999 | Korsh et al. |
| 5,909,449 A | 6/1999 | So et al. |
| 5,912,906 A | 6/1999 | Wu et al. |
| 5,930,167 A | 7/1999 | Lee et al. |
| 5,937,424 A | 8/1999 | Leak et al. |
| 5,942,004 A | 8/1999 | Cappelletti |
| 5,946,716 A | 8/1999 | Karp et al. |
| 5,969,986 A | 10/1999 | Wong et al. |
| 5,982,668 A | 11/1999 | Ishii et al. |
| 5,991,517 A | 11/1999 | Harari et al. |
| 5,995,417 A | 11/1999 | Chen et al. |
| 6,009,014 A | 12/1999 | Hollmer et al. |
| 6,009,016 A | 12/1999 | Ishii et al. |
| 6,023,425 A | 2/2000 | Ishii et al. |
| 6,034,891 A | 3/2000 | Norman |
| 6,040,993 A | 3/2000 | Chen et al. |
| 6,041,430 A | 3/2000 | Yamauchi |
| 6,073,204 A | 6/2000 | Lakhani et al. |
| 6,101,614 A | 8/2000 | Gonzales et al. |
| 6,128,237 A | 10/2000 | Shirley et al. |
| 6,134,140 A | 10/2000 | Tanaka et al. |
| 6,134,143 A | 10/2000 | Norman |
| 6,134,631 A | 10/2000 | Jennings |
| 6,141,261 A | 10/2000 | Patti |
| 6,151,246 A | 11/2000 | So et al. |
| 6,157,573 A | 12/2000 | Ishii et al. |
| 6,166,962 A | 12/2000 | Chen et al. |
| 6,169,691 B1 | 1/2001 | Pasotti et al. |
| 6,178,466 B1 | 1/2001 | Gilbertson et al. |
| 6,185,134 B1 | 2/2001 | Tanaka et al. |
| 6,209,113 B1 | 3/2001 | Roohparvar |
| 6,212,654 B1 | 4/2001 | Lou et al. |
| 6,219,276 B1 | 4/2001 | Parker |
| 6,219,447 B1 | 4/2001 | Lee et al. |
| 6,222,762 B1 | 4/2001 | Guterman et al. |
| 6,230,233 B1 | 5/2001 | Lofgren et al. |
| 6,240,458 B1 | 5/2001 | Gilbertson |
| 6,259,627 B1 | 7/2001 | Wong |
| 6,275,419 B1 | 8/2001 | Guterman et al. |
| 6,278,632 B1 | 8/2001 | Chevallier |
| 6,279,069 B1 | 8/2001 | Robinson et al. |
| 6,288,944 B1 | 9/2001 | Kawamura |
| 6,292,394 B1 | 9/2001 | Cohen et al. |
| 6,301,151 B1 | 10/2001 | Engh et al. |
| 6,304,486 B1 | 10/2001 | Yano |
| 6,307,776 B1 | 10/2001 | So et al. |
| 6,314,044 B1 | 11/2001 | Sasaki et al. |
| 6,317,363 B1 | 11/2001 | Guterman et al. |
| 6,317,364 B1 | 11/2001 | Guterman et al. |
| 6,345,004 B1 | 2/2002 | Omura et al. |
| 6,360,346 B1 | 3/2002 | Miyauchi et al. |
| 6,363,008 B1 | 3/2002 | Wong |
| 6,363,454 B1 | 3/2002 | Lakhani et al. |
| 6,366,496 B1 | 4/2002 | Torelli et al. |
| 6,385,092 B1 | 5/2002 | Ishii et al. |
| 6,392,932 B1 | 5/2002 | Ishii et al. |
| 6,396,742 B1 | 5/2002 | Korsh et al. |
| 6,397,364 B1 | 5/2002 | Barkan |
| 6,405,323 B1 | 6/2002 | Lin et al. |
| 6,405,342 B1 | 6/2002 | Lee |
| 6,418,060 B1 | 7/2002 | Yong et al. |
| 6,442,585 B1 | 8/2002 | Dean et al. |
| 6,445,602 B1 | 9/2002 | Kokudo et al. |
| 6,452,838 B1 | 9/2002 | Ishii et al. |
| 6,456,528 B1 | 9/2002 | Chen |
| 6,466,476 B1 | 10/2002 | Wong et al. |
| 6,467,062 B1 | 10/2002 | Barkan |
| 6,469,931 B1 | 10/2002 | Ban et al. |
| 6,480,948 B1 | 11/2002 | Virajpet et al. |
| 6,490,236 B1 | 12/2002 | Fukuda et al. |
| 6,522,580 B2 | 2/2003 | Chen et al. |
| 6,525,952 B2 | 2/2003 | Araki et al. |
| 6,532,556 B1 | 3/2003 | Wong et al. |
| 6,538,922 B1 | 3/2003 | Khalid et al. |
| 6,549,464 B2 | 4/2003 | Tanaka et al. |
| 6,553,510 B1 | 4/2003 | Pekny et al. |
| 6,558,967 B1 | 5/2003 | Wong |
| 6,560,152 B1 | 5/2003 | Cernea |
| 6,567,311 B2 | 5/2003 | Ishii et al. |
| 6,577,539 B2 | 6/2003 | Iwahashi |
| 6,584,012 B2 | 6/2003 | Banks |
| 6,615,307 B1 | 9/2003 | Roohparvar |
| 6,621,739 B2 | 9/2003 | Gonzales et al. |
| 6,640,326 B1 | 10/2003 | Buckingham et al. |
| 6,643,169 B2 | 11/2003 | Rudelic et al. |
| 6,646,913 B2 | 11/2003 | Micheloni et al. |
| 6,678,192 B2 | 1/2004 | Gongwer et al. |
| 6,683,811 B2 | 1/2004 | Ishii et al. |
| 6,687,155 B2 | 2/2004 | Nagasue |
| 6,707,748 B2 | 3/2004 | Lin et al. |
| 6,708,257 B2 | 3/2004 | Bao |
| 6,714,449 B2 | 3/2004 | Khalid |
| 6,717,847 B2 | 4/2004 | Chen |
| 6,731,557 B2 | 5/2004 | Beretta |
| 6,732,250 B2 | 5/2004 | Durrant |
| 6,738,293 B1 | 5/2004 | Iwahashi |
| 6,751,766 B2 | 6/2004 | Guterman et al. |
| 6,757,193 B2 | 6/2004 | Chen et al. |
| 6,774,808 B1 | 8/2004 | Hibbs et al. |
| 6,781,877 B2 | 8/2004 | Cernea et al. |
| 6,804,805 B2 | 10/2004 | Rub |
| 6,807,095 B2 | 10/2004 | Chen et al. |
| 6,807,101 B2 | 10/2004 | Ooishi et al. |
| 6,809,964 B2 | 10/2004 | Moschopoulos et al. |
| 6,819,592 B2 | 11/2004 | Noguchi et al. |
| 6,829,167 B2 | 12/2004 | Tu et al. |
| 6,845,052 B1 | 1/2005 | Ho et al. |
| 6,851,018 B2 | 2/2005 | Wyatt et al. |

| | | |
|---|---|---|
| 6,851,081 B2 | 2/2005 | Yamamoto |
| 6,856,546 B2 | 2/2005 | Guterman et al. |
| 6,862,218 B2 | 3/2005 | Guterman et al. |
| 6,870,767 B2 | 3/2005 | Rudelic et al. |
| 6,870,773 B2 | 3/2005 | Noguchi et al. |
| 6,873,552 B2 | 3/2005 | Ishii et al. |
| 6,879,520 B2 | 4/2005 | Hosono et al. |
| 6,882,567 B1 | 4/2005 | Wong |
| 6,894,926 B2 | 5/2005 | Guterman et al. |
| 6,907,497 B2 | 6/2005 | Hosono et al. |
| 6,925,009 B2 | 8/2005 | Noguchi et al. |
| 6,930,925 B2 | 8/2005 | Guo et al. |
| 6,934,188 B2 | 8/2005 | Roohparvar |
| 6,937,511 B2 | 8/2005 | Hsu et al. |
| 6,958,938 B2 | 10/2005 | Noguchi et al. |
| 6,963,505 B2 | 11/2005 | Cohen |
| 6,972,993 B2 | 12/2005 | Conley et al. |
| 6,988,175 B2 | 1/2006 | Lasser |
| 6,992,932 B2 | 1/2006 | Cohen |
| 6,999,344 B2 | 2/2006 | Hosono et al. |
| 7,002,843 B2 | 2/2006 | Guterman et al. |
| 7,006,379 B2 | 2/2006 | Noguchi et al. |
| 7,012,835 B2 | 3/2006 | Gonzalez et al. |
| 7,020,017 B2 | 3/2006 | Chen et al. |
| 7,023,735 B2 | 4/2006 | Ban et al. |
| 7,031,210 B2 | 4/2006 | Park et al. |
| 7,031,214 B2 | 4/2006 | Tran |
| 7,031,216 B2 | 4/2006 | You |
| 7,039,846 B2 | 5/2006 | Hewitt et al. |
| 7,042,766 B1 | 5/2006 | Wang et al. |
| 7,054,193 B1 | 5/2006 | Wong |
| 7,054,199 B2 | 5/2006 | Lee et al. |
| 7,057,958 B2 | 6/2006 | So et al. |
| 7,065,147 B2 | 6/2006 | Ophir et al. |
| 7,068,539 B2 | 6/2006 | Guterman et al. |
| 7,071,849 B2 | 7/2006 | Zhang |
| 7,072,222 B2 | 7/2006 | Ishii et al. |
| 7,079,555 B2 | 7/2006 | Baydar et al. |
| 7,088,615 B2 | 8/2006 | Guterman et al. |
| 7,099,194 B2 | 8/2006 | Tu et al. |
| 7,102,924 B2 | 9/2006 | Chen et al. |
| 7,113,432 B2 | 9/2006 | Mokhlesi |
| 7,130,210 B2 | 10/2006 | Bathul et al. |
| 7,139,192 B1 | 11/2006 | Wong |
| 7,139,198 B2 | 11/2006 | Guterman et al. |
| 7,145,805 B2 | 12/2006 | Ishii et al. |
| 7,151,692 B2 | 12/2006 | Wu |
| 7,158,058 B1 | 1/2007 | Yu |
| 7,170,781 B2 | 1/2007 | So et al. |
| 7,170,802 B2 | 1/2007 | Cernea et al. |
| 7,173,859 B2 | 2/2007 | Hemink |
| 7,177,184 B2 | 2/2007 | Chen |
| 7,177,195 B2 | 2/2007 | Gonzales et al. |
| 7,177,199 B2 | 2/2007 | Chen et al. |
| 7,177,200 B2 | 2/2007 | Ronen et al. |
| 7,184,338 B2 | 2/2007 | Nakagawa et al. |
| 7,187,195 B2 | 3/2007 | Kim |
| 7,187,592 B2 | 3/2007 | Guterman et al. |
| 7,190,614 B2 | 3/2007 | Wu |
| 7,193,898 B2 | 3/2007 | Cernea |
| 7,193,921 B2 | 3/2007 | Choi et al. |
| 7,196,644 B1 | 3/2007 | Anderson et al. |
| 7,196,928 B2 | 3/2007 | Chen |
| 7,196,933 B2 | 3/2007 | Shibata |
| 7,197,594 B2 | 3/2007 | Raz et al. |
| 7,200,062 B2 | 4/2007 | Kinsely et al. |
| 7,210,077 B2 | 4/2007 | Brandenberger et al. |
| 7,221,592 B2 | 5/2007 | Nazarian |
| 7,224,613 B2 | 5/2007 | Chen et al. |
| 7,231,474 B1 | 6/2007 | Helms et al. |
| 7,231,562 B2 | 6/2007 | Ohlhoff et al. |
| 7,243,275 B2 | 7/2007 | Gongwer et al. |
| 7,254,690 B2 | 8/2007 | Rao |
| 7,254,763 B2 | 8/2007 | Aadsen et al. |
| 7,257,027 B2 | 8/2007 | Park |
| 7,259,987 B2 | 8/2007 | Chen et al. |
| 7,266,026 B2 | 9/2007 | Gongwer et al. |
| 7,266,069 B2 | 9/2007 | Chu |
| 7,269,066 B2 | 9/2007 | Nguyen et al. |
| 7,272,757 B2 | 9/2007 | Stocken |
| 7,274,611 B2 | 9/2007 | Roohparvar |
| 7,277,355 B2 | 10/2007 | Tanzawa |
| 7,280,398 B1 | 10/2007 | Lee et al. |
| 7,280,409 B2 | 10/2007 | Misumi et al. |
| 7,280,415 B2 | 10/2007 | Hwang et al. |
| 7,283,399 B2 | 10/2007 | Ishii et al. |
| 7,289,344 B2 | 10/2007 | Chen |
| 7,301,807 B2 | 11/2007 | Khalid et al. |
| 7,301,817 B2 | 11/2007 | Li et al. |
| 7,308,525 B2 | 12/2007 | Lasser et al. |
| 7,310,255 B2 | 12/2007 | Chan |
| 7,310,269 B2 | 12/2007 | Shibata |
| 7,310,271 B2 | 12/2007 | Lee |
| 7,310,272 B1 | 12/2007 | Mokhlesi et al. |
| 7,310,347 B2 | 12/2007 | Lasser |
| 7,312,727 B1 | 12/2007 | Feng et al. |
| 7,321,509 B2 | 1/2008 | Chen et al. |
| 7,328,384 B1 | 2/2008 | Kulkarni et al. |
| 7,342,831 B2 | 3/2008 | Mokhlesi et al. |
| 7,343,330 B1 | 3/2008 | Boesjes et al. |
| 7,345,924 B2 | 3/2008 | Nguyen et al. |
| 7,345,928 B2 | 3/2008 | Li |
| 7,349,263 B2 | 3/2008 | Kim et al. |
| 7,356,755 B2 | 4/2008 | Fackenthal |
| 7,363,420 B2 | 4/2008 | Lin et al. |
| 7,365,671 B1 | 4/2008 | Anderson |
| 7,388,781 B2 | 6/2008 | Litsyn et al. |
| 7,397,697 B2 | 7/2008 | So et al. |
| 7,405,974 B2 | 7/2008 | Yaoi et al. |
| 7,405,979 B2 | 7/2008 | Ishii et al. |
| 7,408,804 B2 | 8/2008 | Hemink et al. |
| 7,408,810 B2 | 8/2008 | Aritome et al. |
| 7,409,473 B2 | 8/2008 | Conley et al. |
| 7,409,623 B2 | 8/2008 | Baker et al. |
| 7,420,847 B2 | 9/2008 | Li |
| 7,433,231 B2 | 10/2008 | Aritome |
| 7,433,697 B2 | 10/2008 | Karaoguz et al. |
| 7,434,111 B2 | 10/2008 | Sugiura et al. |
| 7,437,498 B2 | 10/2008 | Ronen |
| 7,440,324 B2 | 10/2008 | Mokhlesi |
| 7,440,331 B2 | 10/2008 | Hemink |
| 7,441,067 B2 | 10/2008 | Gorobetz et al. |
| 7,447,970 B2 | 11/2008 | Wu et al. |
| 7,450,421 B2 | 11/2008 | Mokhlesi et al. |
| 7,453,737 B2 | 11/2008 | Ha |
| 7,457,163 B2 | 11/2008 | Hemink |
| 7,457,897 B1 | 11/2008 | Lee et al. |
| 7,460,410 B2 | 12/2008 | Nagai et al. |
| 7,460,412 B2 | 12/2008 | Lee et al. |
| 7,466,592 B2 | 12/2008 | Mitani et al. |
| 7,468,907 B2 | 12/2008 | Kang et al. |
| 7,468,911 B2 | 12/2008 | Lutze et al. |
| 7,469,049 B1 | 12/2008 | Feng |
| 7,471,581 B2 | 12/2008 | Tran et al. |
| 7,483,319 B2 | 1/2009 | Brown |
| 7,487,329 B2 | 2/2009 | Hepkin et al. |
| 7,487,394 B2 | 2/2009 | Forhan et al. |
| 7,492,641 B2 | 2/2009 | Hosono et al. |
| 7,508,710 B2 | 3/2009 | Mokhlesi |
| 7,526,711 B2 | 4/2009 | Orio |
| 7,539,061 B2 | 5/2009 | Lee |
| 7,539,062 B2 | 5/2009 | Doyle |
| 7,551,492 B2 | 6/2009 | Kim |
| 7,558,109 B2 | 7/2009 | Brandman et al. |
| 7,558,839 B1 | 7/2009 | McGovern |
| 7,568,135 B2 | 7/2009 | Cornwell et al. |
| 7,570,520 B2 | 8/2009 | Kamei et al. |
| 7,574,555 B2 | 8/2009 | Porat et al. |
| 7,590,002 B2 | 9/2009 | Mokhlesi et al. |
| 7,593,259 B2 | 9/2009 | Kim |
| 7,594,093 B1 | 9/2009 | Kancherla |
| 7,596,707 B1 | 9/2009 | Vemula |
| 7,609,787 B2 | 10/2009 | Jahan et al. |
| 7,613,043 B2 | 11/2009 | Cornwell et al. |
| 7,616,498 B2 | 11/2009 | Mokhlesi et al. |
| 7,619,918 B2 | 11/2009 | Aritome |
| 7,631,245 B2 | 12/2009 | Lasser |
| 7,633,798 B2 | 12/2009 | Sarin et al. |

| | | |
|---|---|---|
| 7,633,802 B2 | 12/2009 | Mokhlesi |
| 7,639,532 B2 | 12/2009 | Roohparvar et al. |
| 7,644,347 B2 | 1/2010 | Alexander et al. |
| 7,656,734 B2 | 2/2010 | Thorp et al. |
| 7,660,158 B2 | 2/2010 | Aritome |
| 7,660,183 B2 | 2/2010 | Ware et al. |
| 7,661,000 B2 | 2/2010 | Ueda et al. |
| 7,661,054 B2 | 2/2010 | Huffman et al. |
| 7,665,007 B2 | 2/2010 | Yang et al. |
| 7,680,987 B1 | 3/2010 | Clark et al. |
| 7,733,712 B1 | 6/2010 | Walston et al. |
| 7,742,351 B2 | 6/2010 | Inoue et al. |
| 7,761,624 B2 | 7/2010 | Karamcheti et al. |
| 7,797,609 B2 | 9/2010 | Neuman |
| 7,810,017 B2 | 10/2010 | Radke |
| 7,848,149 B2 | 12/2010 | Gonzalez et al. |
| 7,869,273 B2 | 1/2011 | Lee et al. |
| 7,885,119 B2 | 2/2011 | Li |
| 7,904,783 B2 | 3/2011 | Brandman et al. |
| 7,928,497 B2 | 4/2011 | Yaegashi |
| 7,929,549 B1 | 4/2011 | Talbot |
| 7,930,515 B2 | 4/2011 | Gupta et al. |
| 7,945,825 B2 | 5/2011 | Cohen et al. |
| 7,978,516 B2 | 7/2011 | Olbrich et al. |
| 8,014,094 B1 | 9/2011 | Jin |
| 8,037,380 B2 | 10/2011 | Cagno et al. |
| 8,040,744 B2 | 10/2011 | Gorobets et al. |
| 8,065,583 B2 | 11/2011 | Radke |
| 2001/0002172 A1 | 5/2001 | Tanaka et al. |
| 2001/0006479 A1 | 7/2001 | Ikehashi et al. |
| 2002/0038440 A1 | 3/2002 | Barkan |
| 2002/0056064 A1 | 5/2002 | Kidorf et al. |
| 2002/0118574 A1 | 8/2002 | Gongwer et al. |
| 2002/0133684 A1 | 9/2002 | Anderson |
| 2002/0166091 A1 | 11/2002 | Kidorf et al. |
| 2002/0174295 A1 | 11/2002 | Ulrich et al. |
| 2002/0196510 A1 | 12/2002 | Hietala et al. |
| 2003/0002348 A1 | 1/2003 | Chen et al. |
| 2003/0103400 A1 | 6/2003 | Van Tran |
| 2003/0161183 A1 | 8/2003 | Tran |
| 2003/0189856 A1 | 10/2003 | Cho et al. |
| 2004/0057265 A1 | 3/2004 | Mirabel et al. |
| 2004/0057285 A1 | 3/2004 | Cernea et al. |
| 2004/0083333 A1 | 4/2004 | Chang et al. |
| 2004/0083334 A1 | 4/2004 | Chang et al. |
| 2004/0105311 A1 | 6/2004 | Cernea et al. |
| 2004/0114437 A1 | 6/2004 | Li |
| 2004/0160842 A1 | 8/2004 | Fukiage |
| 2004/0223371 A1 | 11/2004 | Roohparvar |
| 2005/0007802 A1 | 1/2005 | Gerpheide |
| 2005/0013165 A1 | 1/2005 | Ban |
| 2005/0024941 A1 | 2/2005 | Lasser et al. |
| 2005/0024978 A1 | 2/2005 | Ronen |
| 2005/0030788 A1 | 2/2005 | Parkinson et al. |
| 2005/0086574 A1 | 4/2005 | Fackenthal |
| 2005/0121436 A1 | 6/2005 | Kamitani et al. |
| 2005/0144361 A1 | 6/2005 | Gonzalez et al. |
| 2005/0157555 A1 | 7/2005 | Ono et al. |
| 2005/0162913 A1 | 7/2005 | Chen |
| 2005/0169051 A1 | 8/2005 | Khalid et al. |
| 2005/0189649 A1 | 9/2005 | Maruyama et al. |
| 2005/0213393 A1 | 9/2005 | Lasser |
| 2005/0224853 A1 | 10/2005 | Ohkawa |
| 2005/0240745 A1 | 10/2005 | Iyer et al. |
| 2005/0243626 A1 | 11/2005 | Ronen |
| 2006/0004952 A1 | 1/2006 | Lasser |
| 2006/0028875 A1 | 2/2006 | Avraham et al. |
| 2006/0028877 A1 | 2/2006 | Meir |
| 2006/0101193 A1 | 5/2006 | Murin |
| 2006/0106972 A1 | 5/2006 | Gorobets et al. |
| 2006/0107136 A1 | 5/2006 | Gongwer et al. |
| 2006/0129750 A1 | 6/2006 | Lee et al. |
| 2006/0133141 A1 | 6/2006 | Gorobets |
| 2006/0156189 A1 | 7/2006 | Tomlin |
| 2006/0179334 A1 | 8/2006 | Brittain et al. |
| 2006/0190699 A1 | 8/2006 | Lee |
| 2006/0203546 A1 | 9/2006 | Lasser |
| 2006/0218359 A1 | 9/2006 | Sanders et al. |
| 2006/0221692 A1 | 10/2006 | Chen |
| 2006/0221705 A1 | 10/2006 | Hemink et al. |
| 2006/0221714 A1 | 10/2006 | Li et al. |
| 2006/0239077 A1 | 10/2006 | Park et al. |
| 2006/0239081 A1 | 10/2006 | Roohparvar |
| 2006/0256620 A1 | 11/2006 | Nguyen et al. |
| 2006/0256626 A1 | 11/2006 | Werner et al. |
| 2006/0256891 A1 | 11/2006 | Yuan et al. |
| 2006/0271748 A1 | 11/2006 | Jain et al. |
| 2006/0285392 A1 | 12/2006 | Incarnati et al. |
| 2006/0285396 A1 | 12/2006 | Ha |
| 2007/0006013 A1 | 1/2007 | Moshayedi et al. |
| 2007/0019481 A1 | 1/2007 | Park |
| 2007/0033581 A1 | 2/2007 | Tomlin et al. |
| 2007/0047314 A1 | 3/2007 | Goda et al. |
| 2007/0047326 A1 | 3/2007 | Nguyen et al. |
| 2007/0050536 A1 | 3/2007 | Kolokowsky |
| 2007/0058446 A1 | 3/2007 | Hwang et al. |
| 2007/0061502 A1 | 3/2007 | Lasser et al. |
| 2007/0067667 A1 | 3/2007 | Ikeuchi et al. |
| 2007/0074093 A1 | 3/2007 | Lasser |
| 2007/0086239 A1 | 4/2007 | Litsyn et al. |
| 2007/0086260 A1 | 4/2007 | Sinclair |
| 2007/0089034 A1 | 4/2007 | Litsyn et al. |
| 2007/0091677 A1 | 4/2007 | Lasser et al. |
| 2007/0091694 A1 | 4/2007 | Lee et al. |
| 2007/0103978 A1 | 5/2007 | Conley et al. |
| 2007/0103986 A1 | 5/2007 | Chen |
| 2007/0104211 A1 | 5/2007 | Opsasnick |
| 2007/0109845 A1 | 5/2007 | Chen |
| 2007/0109849 A1 | 5/2007 | Chen |
| 2007/0115726 A1 | 5/2007 | Cohen et al. |
| 2007/0118713 A1 | 5/2007 | Guterman et al. |
| 2007/0143378 A1 | 6/2007 | Gorobetz |
| 2007/0143531 A1 | 6/2007 | Atri |
| 2007/0159889 A1 | 7/2007 | Kang et al. |
| 2007/0159892 A1 | 7/2007 | Kang et al. |
| 2007/0159907 A1 | 7/2007 | Kwak |
| 2007/0168837 A1 | 7/2007 | Murin |
| 2007/0171714 A1 | 7/2007 | Wu et al. |
| 2007/0183210 A1 | 8/2007 | Choi et al. |
| 2007/0189073 A1 | 8/2007 | Aritome |
| 2007/0195602 A1 | 8/2007 | Fong et al. |
| 2007/0206426 A1 | 9/2007 | Mokhlesi |
| 2007/0208904 A1 | 9/2007 | Hsieh et al. |
| 2007/0226599 A1 | 9/2007 | Motwani |
| 2007/0236990 A1 | 10/2007 | Aritome |
| 2007/0253249 A1 | 11/2007 | Kang et al. |
| 2007/0256620 A1 | 11/2007 | Viggiano et al. |
| 2007/0263455 A1 | 11/2007 | Cornwell et al. |
| 2007/0266232 A1 | 11/2007 | Rodgers et al. |
| 2007/0271424 A1 | 11/2007 | Lee et al. |
| 2007/0280000 A1 | 12/2007 | Fujiu et al. |
| 2007/0291571 A1 | 12/2007 | Balasundaram |
| 2007/0297234 A1 | 12/2007 | Cernea et al. |
| 2008/0010395 A1 | 1/2008 | Mylly et al. |
| 2008/0025121 A1 | 1/2008 | Tanzawa |
| 2008/0043535 A1 | 2/2008 | Roohparvar |
| 2008/0049504 A1 | 2/2008 | Kasahara et al. |
| 2008/0049506 A1 | 2/2008 | Guterman |
| 2008/0052446 A1 | 2/2008 | Lasser et al. |
| 2008/0055993 A1 | 3/2008 | Lee |
| 2008/0080243 A1 | 4/2008 | Edahiro et al. |
| 2008/0082730 A1 | 4/2008 | Kim et al. |
| 2008/0089123 A1 | 4/2008 | Chae et al. |
| 2008/0104309 A1 | 5/2008 | Cheon et al. |
| 2008/0104312 A1 | 5/2008 | Lasser |
| 2008/0109590 A1 | 5/2008 | Jung et al. |
| 2008/0115017 A1 | 5/2008 | Jacobson |
| 2008/0123420 A1 | 5/2008 | Brandman et al. |
| 2008/0123426 A1 | 5/2008 | Lutze et al. |
| 2008/0126686 A1 | 5/2008 | Sokolov et al. |
| 2008/0130341 A1 | 6/2008 | Shalvi et al. |
| 2008/0148115 A1 | 6/2008 | Sokolov et al. |
| 2008/0151618 A1 | 6/2008 | Sharon et al. |
| 2008/0151667 A1 | 6/2008 | Miu et al. |
| 2008/0158958 A1 | 7/2008 | Sokolov et al. |
| 2008/0181001 A1 | 7/2008 | Shalvi |
| 2008/0198650 A1 | 8/2008 | Shalvi et al. |
| 2008/0198654 A1 | 8/2008 | Toda |

| | | |
|---|---|---|
| 2008/0209116 A1 | 8/2008 | Caulkins |
| 2008/0209304 A1 | 8/2008 | Winarski et al. |
| 2008/0215798 A1 | 9/2008 | Sharon et al. |
| 2008/0219050 A1 | 9/2008 | Shalvi et al. |
| 2008/0239093 A1 | 10/2008 | Easwar et al. |
| 2008/0239812 A1 | 10/2008 | Abiko et al. |
| 2008/0253188 A1 | 10/2008 | Aritome |
| 2008/0263262 A1 | 10/2008 | Sokolov et al. |
| 2008/0263676 A1 | 10/2008 | Mo et al. |
| 2008/0270730 A1 | 10/2008 | Lasser et al. |
| 2008/0282106 A1 | 11/2008 | Shalvi et al. |
| 2008/0288714 A1 | 11/2008 | Salomon et al. |
| 2009/0013233 A1 | 1/2009 | Radke |
| 2009/0024905 A1 | 1/2009 | Shalvi et al. |
| 2009/0034337 A1 | 2/2009 | Aritome |
| 2009/0043831 A1 | 2/2009 | Antonopoulos et al. |
| 2009/0043951 A1 | 2/2009 | Shalvi et al. |
| 2009/0049234 A1 | 2/2009 | Oh et al. |
| 2009/0073762 A1 | 3/2009 | Lee et al. |
| 2009/0086542 A1 | 4/2009 | Lee et al. |
| 2009/0089484 A1 | 4/2009 | Chu |
| 2009/0091979 A1 | 4/2009 | Shalvi |
| 2009/0094930 A1 | 4/2009 | Schwoerer |
| 2009/0106485 A1 | 4/2009 | Anholt |
| 2009/0112949 A1 | 4/2009 | Ergan et al. |
| 2009/0132755 A1 | 5/2009 | Radke |
| 2009/0144600 A1 | 6/2009 | Perlmutter et al. |
| 2009/0150894 A1 | 6/2009 | Huang et al. |
| 2009/0157950 A1 | 6/2009 | Selinger |
| 2009/0157964 A1 | 6/2009 | Kasorla et al. |
| 2009/0158126 A1 | 6/2009 | Perlmutter et al. |
| 2009/0168524 A1 | 7/2009 | Golov et al. |
| 2009/0172257 A1 | 7/2009 | Prins et al. |
| 2009/0172261 A1 | 7/2009 | Prins et al. |
| 2009/0193184 A1 | 7/2009 | Yu et al. |
| 2009/0199074 A1 | 8/2009 | Sommer et al. |
| 2009/0204824 A1 | 8/2009 | Lin et al. |
| 2009/0204872 A1 | 8/2009 | Yu et al. |
| 2009/0213653 A1 | 8/2009 | Perlmutter et al. |
| 2009/0213654 A1 | 8/2009 | Perlmutter et al. |
| 2009/0225595 A1 | 9/2009 | Kim |
| 2009/0228761 A1 | 9/2009 | Perlmutter et al. |
| 2009/0240872 A1 | 9/2009 | Perlmutter et al. |
| 2009/0265509 A1 | 10/2009 | Klein |
| 2009/0300227 A1 | 12/2009 | Nochimowski et al. |
| 2009/0323412 A1 | 12/2009 | Mokhlesi et al. |
| 2009/0327608 A1 | 12/2009 | Eschmann |
| 2010/0017650 A1 | 1/2010 | Chin et al. |
| 2010/0034022 A1 | 2/2010 | Dutta et al. |
| 2010/0057976 A1 | 3/2010 | Lasser |
| 2010/0061151 A1 | 3/2010 | Miwa et al. |
| 2010/0082883 A1 | 4/2010 | Chen et al. |
| 2010/0083247 A1 | 4/2010 | Kanevsky et al. |
| 2010/0110580 A1 | 5/2010 | Takashima |
| 2010/0124088 A1 | 5/2010 | Shalvi et al. |
| 2010/0131697 A1 | 5/2010 | Alrod et al. |
| 2010/0131827 A1 | 5/2010 | Sokolov et al. |
| 2010/0142268 A1 | 6/2010 | Aritome |
| 2010/0142277 A1 | 6/2010 | Yang et al. |
| 2010/0157675 A1 | 6/2010 | Shalvi et al. |
| 2010/0165689 A1 | 7/2010 | Rotbard et al. |
| 2010/0169547 A1 | 7/2010 | Ou |
| 2010/0169743 A1 | 7/2010 | Vogan et al. |
| 2010/0174847 A1 | 7/2010 | Paley et al. |
| 2010/0211803 A1 | 8/2010 | Lablans |
| 2010/0287217 A1 | 11/2010 | Borchers et al. |
| 2011/0010489 A1 | 1/2011 | Yeh |
| 2011/0010490 A1* | 1/2011 | Kwon et al. ............ 711/103 |
| 2011/0060969 A1 | 3/2011 | Ramamoorthy et al. |
| 2011/0066793 A1 | 3/2011 | Burd |
| 2011/0075482 A1 | 3/2011 | Shepard et al. |
| 2011/0107049 A1 | 5/2011 | Kwon et al. |
| 2011/0149657 A1 | 6/2011 | Haratsch et al. |
| 2011/0199823 A1 | 8/2011 | Bar-Or et al. |
| 2011/0264843 A1* | 10/2011 | Haines et al. ............ 711/103 |
| 2011/0283049 A1* | 11/2011 | Kang et al. ............ 711/103 |
| 2011/0302354 A1 | 12/2011 | Miller |
| 2011/0302477 A1* | 12/2011 | Goss et al. ............ 714/773 |
| 2012/0117309 A1* | 5/2012 | Schuette ............ 711/103 |
| 2012/0233396 A1* | 9/2012 | Flynn et al. ............ 711/108 |
| 2012/0246443 A1* | 9/2012 | Meir et al. ............ 711/209 |

FOREIGN PATENT DOCUMENTS

| | | |
|---|---|---|
| EP | 1605509 A1 | 12/2005 |
| WO | 9610256 A1 | 4/1996 |
| WO | 9828745 A1 | 7/1998 |
| WO | 02100112 A1 | 12/2002 |
| WO | 03100791 A1 | 12/2003 |
| WO | 2007046084 A2 | 4/2007 |
| WO | 2007132452 A2 | 11/2007 |
| WO | 2007132453 A2 | 11/2007 |
| WO | 2007132456 A2 | 11/2007 |
| WO | 2007132457 A2 | 11/2007 |
| WO | 2007132458 A2 | 11/2007 |
| WO | 2007146010 A2 | 12/2007 |
| WO | 2008026203 A2 | 3/2008 |
| WO | 2008053472 A2 | 5/2008 |
| WO | 2008053473 A2 | 5/2008 |
| WO | 2008068747 A2 | 6/2008 |
| WO | 2008077284 A1 | 7/2008 |
| WO | 2008083131 A2 | 7/2008 |
| WO | 2008099958 A1 | 8/2008 |
| WO | 2008111058 A2 | 9/2008 |
| WO | 2008124760 A2 | 10/2008 |
| WO | 2008139441 A2 | 11/2008 |
| WO | 2009037691 A2 | 3/2009 |
| WO | 2009037697 A2 | 3/2009 |
| WO | 2009038961 A2 | 3/2009 |
| WO | 2009050703 A2 | 4/2009 |
| WO | 2009053961 A2 | 4/2009 |
| WO | 2009053962 A2 | 4/2009 |
| WO | 2009053963 A2 | 4/2009 |
| WO | 2009063450 A2 | 5/2009 |
| WO | 2009072100 A2 | 6/2009 |
| WO | 2009072101 A2 | 6/2009 |
| WO | 2009072102 A2 | 6/2009 |
| WO | 2009072103 A2 | 6/2009 |
| WO | 2009072104 A2 | 6/2009 |
| WO | 2009072105 A2 | 6/2009 |
| WO | 2009074978 A2 | 6/2009 |
| WO | 2009074979 A2 | 6/2009 |
| WO | 2009078006 A2 | 6/2009 |
| WO | 2009095902 A2 | 8/2009 |
| WO | 2011024015 A1 | 3/2011 |

OTHER PUBLICATIONS

U.S. Appl. No. 11/945,575 Official Action dated Aug. 24, 2010.
U.S. Appl. No. 12/045,520 Official Action dated Nov. 16, 2010.
U.S. Appl. No. 12/880,101 "Reuse of Host Hibernation Storage Space by Memory Controller", filed Sep. 12, 2010.
U.S. Appl. No. 12/890,724 "Error Correction Coding Over Multiple Memory PAges", filed Sep. 27, 2010.
U.S. Appl. No. 12/171,797 Official Action dated Aug. 25, 2010.
U.S. Appl. No. 12/497,707 Official Action dated Sep. 15, 2010.
U.S. Appl. No. 11/995,801 Official Action dated Oct. 15, 2010.
Numonyx, "M25PE16: 16-Mbit, page-erasable serial flash memory with byte-alterability, 75 MHz SPI bus, standard pinout", Apr. 2008.
Ankolekar et al., "Multibit Error-Correction Methods for Latency-Constrained Flash Memory Systems", IEEE Transactions on Device and Materials Reliability, vol. 10, No. 1, pp. 33-39, Mar. 2010.
U.S. Appl. No. 12/344,233 Official Action dated Jun. 24, 2011.
U.S. Appl. No. 11/995,813 Official Action dated Jun. 16, 2011.
Berman et al., "Mitigating Inter-Cell Coupling Effects in MLC NAND Flash via Constrained Coding", Flash Memory Summit, Santa Clara, USA, Aug. 19, 2010.
U.S. Appl. No. 12/178,318 Official Action dated May 31, 2011.
CN Patent Application # 200780026181.3 Official Action dated Apr. 8, 2011.
Agrell et al., "Closest Point Search in Lattices", IEEE Transactions on Information Theory, vol. 48, No. 8, pp. 2201-2214, Aug. 2002.
Bez et al., "Introduction to Flash memory", Proceedings of the IEEE, vol. 91, No. 4, pp. 489-502, Apr. 2003.
Blahut, R.E., "Theory and Practice of Error Control Codes," Addison-Wesley, May 1984, section 3.2, pp. 47-48.

Chang, L., "Hybrid Solid State Disks: Combining Heterogeneous NAND Flash in Large SSDs", ASPDAC, Jan. 2008.

Cho et al., "Multi-Level NAND Flash Memory with Non-Uniform Threshold Voltage Distribution," IEEE International Solid-State Circuits Conference (ISSCC), San Francisco, CA, Feb. 5-7, 2001, pp. 28-29 and 424.

Databahn™, "Flash memory controller IP", Denali Software, Inc., 1994 https://www.denali.com/en/products/databahn_flash.jsp.

Datalight, Inc., "FlashFX Pro 3.1 High Performance Flash Manager for Rapid Development of Reliable Products", Nov. 16, 2006.

Duann, N., Silicon Motion Presentation "SLC & MLC Hybrid", Flash Memory Summit, Santa Clara, USA, Aug. 2008.

Eitan et al., "Can NROM, a 2-bit, Trapping Storage NVM Cell, Give a Real Challenge to Floating Gate Cells?", Proceedings of the 1999 International Conference on Solid State Devices and Materials (SSDM), p. 522-524, Tokyo, Japan 1999.

Eitan et al., "Multilevel Flash Cells and their Trade-Offs", Proceedings of the 1996 IEEE International Electron Devices Meeting (IEDM), pp. 169-172, New York, USA 1996.

Engh et al., "A self adaptive programming method with 5 mV accuracy for multi-level storage in FLASH", pp. 115-118, Proceedings of the IEEE 2002 Custom Integrated Circuits Conference, May 12-15, 2002.

Goodman et al., "On-Chip ECC for Multi-Level Random Access Memories," Proceedings of the IEEE/CAM Information Theory Workshop, Ithaca, USA, Jun. 25-29, 1989.

Han et al., "An Intelligent Garbage Collection Algorithm for Flash Memory Storages", Computational Science and Its Applications—ICCSA 2006, vol. 3980/2006, pp. 1019-1027, Springer Berlin / Heidelberg, Germany, May 11, 2006.

Han et al., "CATA: A Garbage Collection Scheme for Flash Memory File Systems", Ubiquitous Intelligence and Computing, vol. 4159/2006, pp. 103-112, Springer Berlin / Heidelberg, Aug. 25, 2006.

Horstein, "On the Design of Signals for Sequential and Nonsequential Detection Systems with Feedback," IEEE Transactions on Information Theory IT-12:4 (Oct. 1966), pp. 448-455.

Jung et al., in "A 117 mm.sup.2 3.3V Only 128 Mb Multilevel NAND Flash Memory for Mass Storage Applications," IEEE Journal of Solid State Circuits, (11:31), Nov. 1996, pp. 1575-1583.

Kawaguchi et al. 1995. A flash-memory based file system. In Proceedings of the USENIX 1995 Technical Conference, New Orleans, Louisiana. 155-164.

Kim et al., "Future Memory Technology including Emerging New Memories", Proceedings of the 24th International Conference on Microelectronics (MIEL), vol. 1, pp. 377-384, Nis, Serbia and Montenegro, May 16-19, 2004.

Lee et al., "Effects of Floating Gate Interference on NAND Flash Memory Cell Operation", IEEE Electron Device Letters, vol. 23, No. 5, pp. 264-266, May 2002.

Maayan et al., "A 512 Mb NROM Flash Data Storage Memory with 8 MB/s Data Rate", Proceedings of the 2002 IEEE International Solid-State circuits Conference (ISSCC 2002), pp. 100-101, San Francisco, USA, Feb. 3-7, 2002.

Mielke et al., "Recovery Effects in the Distributed Cycling of Flash Memories", IEEE 44th Annual International Reliability Physics Symposium, pp. 29-35, San Jose, USA, Mar. 2006.

ONFI, "Open NAND Flash Interface Specification," revision 1.0, Dec. 28, 2006.

Phison Electronics Corporation, "PS8000 Controller Specification (for SD Card)", revision 1.2, Document No. S-07018, Mar. 28, 2007.

Shalvi, et al., "Signal Codes," Proceedings of the 2003 IEEE Information Theory Workshop (ITW'2003), Paris, France, Mar. 31-Apr. 4, 2003.

Shiozaki, A., "Adaptive Type-II Hybrid Broadcast ARQ System", IEEE Transactions on Communications, vol. 44, Issue 4, pp. 420-422, Apr. 1996.

Suh et al., "A 3.3V 32Mb NAND Flash Memory with Incremental Step Pulse Programming Scheme", IEEE Journal of Solid-State Circuits, vol. 30, No. 11, pp. 1149-1156, Nov. 1995.

ST Microelectronics, "Bad Block Management in NAND Flash Memories", Application note AN-1819, Geneva, Switzerland, May 2004.

ST Microelectronics, "Wear Leveling in Single Level Cell NAND Flash Memories," Application note AN-1822 Geneva, Switzerland, Feb. 2007.

Takeuchi et al., "A Double Level $V_{TH}$ Select Gate Array Architecture for Multi-Level NAND Flash Memories", Digest of Technical Papers, 1995 Symposium on VLSI Circuits, pp. 69-70, Jun. 8-10, 1995.

Takeuchi et al., "A Multipage Cell Architecture for High-Speed Programming Multilevel NAND Flash Memories", IEEE Journal of Solid State Circuits, vol. 33, No. 8, Aug. 1998.

Wu et al., "eNVy: A non-Volatile, Main Memory Storage System", Proceedings of the 6th International Conference on Architectural support for programming languages and operating systems, pp. 86-87, San Jose, USA, 1994.

International Application PCT/IL2007/000575 Patentability report dated Mar. 26, 2009.

International Application PCT/IL2007/000575 Search Report dated May 30, 2008.

International Application PCT/IL2007/000576 Patentability Report dated Mar. 19, 2009.

International Application PCT/IL2007/000576 Search Report dated Jul. 7, 2008.

International Application PCT/IL2007/000579 Patentability report dated Mar. 10, 2009.

International Application PCT/IL2007/000579 Search report dated Jul. 3, 2008.

International Application PCT/IL2007/000580 Patentability Report dated Mar. 10, 2009.

International Application PCT/IL2007/000580 Search Report dated Sep. 11, 2008.

International Application PCT/IL2007/000581 Patentability Report dated Mar. 26, 2009.

International Application PCT/IL2007/000581 Search Report dated Aug. 25, 2008.

International Application PCT/IL2007/001059 Patentability report dated Apr. 19, 2009.

International Application PCT/IL2007/001059 Search report dated Aug. 7, 2008.

International Application PCT/IL2007/001315 search report dated Aug. 7, 2008.

International Application PCT/IL2007/001315 Patentability Report dated May 5, 2009.

International Application PCT/IL2007/001316 Search report dated Jul. 22, 2008.

International Application PCT/IL2007/001316 Patentability Report dated May 5, 2009.

International Application PCT/IL2007/001488 Search report dated Jun. 20, 2008.

International Application PCT/IL2008/000329 Search report dated Nov. 25, 2008.

International Application PCT/IL2008/000519 Search report dated Nov. 20, 2008.

International Application PCT/IL2008/001188 Search Report dated Jan. 28, 2009.

International Application PCT/IL2008/001356 Search Report dated Feb. 3, 2009.

International Application PCT/IL2008/001446 Search Report dated Feb. 20, 2009.

U.S. Appl. No. 11/949,135 Official Action dated Oct. 2, 2009.

U.S. Appl. No. 12/019,011 Official Action dated Nov. 20, 2009.

Sommer, N., U.S. Appl. No. 12/171,797 "Memory Device with Non-Uniform Programming Levels" filed Jul. 11, 2008.

Shalvi et al., U.S. Appl. No. 12/251,471 "Compensation for Voltage Drifts in Analog Memory Cells" filed Oct. 15, 2008.

Sommer et al., U.S. Appl. No. 12/497,707 "Data Storage in Analog Memory Cells with Protection Against Programming Interruption" filed Jul. 6, 2009.

Winter et al., U.S. Appl. No. 12/534,893 "Improved Data Storage in Analog Memory Cells Using Modified Pass Voltages" filed Aug. 4, 2009.

Winter et al., U.S. Appl. No. 12/534,898 "Data Storage Using Modified Voltages" filed Aug. 4, 2009.

Shalvi et al., U.S. Appl. No. 12/551,583 "Segmented Data Storage" filed Sep. 1, 2009.
Shalvi et al., U.S. Appl. No. 12/551, 567 "Reliable Data Storage in Analog Memory Cells Subjected to Long Retention Periods" filed Sep. 1, 2009.
Perlmutter et al., U.S. Appl. No. 12/558,528 "Estimation of Memory Cell Read Thresholds by Sampling Inside Programming Level Distribution Intervals" filed Sep. 13, 2009.
Sokolov, D., U.S. Appl. No. 12/579,430 "Efficient Programming of Analog Memory Cell Devices" filed Oct. 15, 2009.
Shalvi, O., U.S. Appl. No. 12/579,432 "Efficient Data Storage in Storage Device Arrays" filed Oct. 15, 2009.
Sommer et al., U.S. Appl. No. 12/607,078 "Data Scrambling in Memory Devices" filed Oct. 28, 2009.
Sommer et al., U.S. Appl. No. 12/607,085 "Data Scrambling Schemes for Memory Devices" filed Oct. 28, 2009.
Sommer et al., U.S. Appl. No. 12/649,358 "Efficient Readout Schemes for Analog Memory Cell Devices" filed Dec. 30, 2009.
Sommer et al., U.S. Appl. No. 12/649,360 "Efficient Readout Schemes for Analog Memory Cell Devices Using Multiple Read Threshold Sets" filed Dec. 30, 2009.
Shachar et al. U.S. Appl. No. 12/688,883 "Hierarchical data storage system" filed Jan. 17, 2010.
Shalvi, O., U.S. Appl. No. 12/758,044 "Memory device with negative thresholds" filed Apr. 12, 2010.
Sokolov et al., U.S. Appl. No. 12/714,501 "Selective Activation of Programming Schemes in Analog Memory Cell Arrays" filed Feb. 28, 2010.
Sokolov et al., U.S. Appl. No. 12/728,287 "Use of host system resources by memory controller" filed Mar. 22, 2010.
Sommer et al., U.S. Appl. No. 12/728,296 "Database of Memory Read Thresholds" filed Mar. 22, 2010.
Sommer et al., U.S. Appl. No. 12/758,003 "Selective re-programming of analog memory cells" filed Apr. 11, 2010.
Huffman, A., "Non-Volatile Memory Host Controller Interface (NVMHCI)", Specification 1.0, Apr. 14, 2008.
U.S. Appl. No. 11/957,970 Official Action dated May 20, 2010.
Panchbhai et al., "Improving Reliability of NAND Based Flash Memory Using Hybrid SLC/MLC Device", Project Proposal for CSci 8980—Advanced Storage Systems, University of Minnesota, USA, Spring 2009.
Jedec Standard JESD84-C44, "Embedded MultiMediaCard (eMMC) Mechanical Standard, with Optional Reset Signal", Jedec Solid State Technology Association, USA, Jul. 2009.
Jedec, "UFS Specification", version 0.1, Nov. 11, 2009.
SD Group and SD Card Association, "SD Specifications Part 1 Physical Layer Specification", version 3.01, draft 1.00, Nov. 9, 2009.
Compaq et al., "Universal Serial Bus Specification", revision 2.0, Apr. 27, 2000.
Serial ATA International Organization, "Seiral ATA Revision 3.0 Specification", Jun. 2, 2009.
Gotou, H., "An Experimental Confirmation of Automatic Threshold Voltage Convergence in a Flash Memory Using Alternating Word-Line Voltage Pulses", IEEE Electron Device Letters, vol. 18, No. 10, pp. 503-505, Oct. 1997.
U.S. Appl. No. 12/323,544 Office Action dated Dec. 13, 2011.
U.S. Appl. No. 12/332,368 Office Action dated Nov. 10, 2011.
U.S. Appl. No. 12/063,544 Office Action dated Dec. 14, 2011.
U.S. Appl. No. 12/186,867 Office Action dated Jan. 17, 2012.
U.S. Appl. No. 12/119,069 Office Action dated Nov. 14, 2011.
U.S. Appl. No. 12/037,487 Office Action dated Jan. 3, 2012.
U.S. Appl. No. 11/995,812 Office Action dated Oct. 28, 2011.
U.S. Appl. No. 12/551,567 Office Action dated Oct. 27, 2011.
U.S. Appl. No. 12/618,732 Office Action dated Nov. 4, 2011.
U.S. Appl. No. 12/649,382 Office Action dated Jan. 6, 2012.
U.S. Appl. No. 13/284,909, filed Oct. 30, 2011.
U.S. Appl. No. 13/284,913, filed Oct. 30, 2011.
U.S. Appl. No. 13/338,335, filed Dec. 28, 2011.
U.S. Appl. No. 13/355,536, filed Jan. 22, 2012.
Kim et al., "Multi-bit Error Tolerant Caches Using Two-Dimensional Error Coding", Proceedings of the 40th Annual ACM/IEEE International Symposium on Microarchitecture (MICRO-40), Chicago, USA, Dec. 1-5, 2007.
U.S. Appl. No. 11/995,814 Official Action dated Dec. 17, 2010.
U.S. Appl. No. 12/388,528 Official Action dated Nov. 29, 2010.
U.S. Appl. No. 12/251,471 Official Action dated Jan. 3, 2011.
Engineering Windows 7, "Support and Q&A for Solid-State Drives", e7blog, May 5, 2009.
Micron Technology Inc., "Memory Management in NAND Flash Arrays", Technical Note, year 2005.
Kang et al., "A Superblock-based Flash Translation Layer for NAND Flash Memory", Proceedings of the 6th ACM & IEEE International Conference on Embedded Software, pp. 161-170, Seoul, Korea, Oct. 22-26, 2006.
Park et al., "Sub-Grouped Superblock Management for High-Performance Flash Storages", IEICE Electronics Express, vol. 6, No. 6, pp. 297-303, Mar. 25, 2009.
"How to Resolve "Bad Super Block: Magic Number Wrong" in BSD", Free Online Articles Director Article Base, posted Sep. 5, 2009.
Ubuntu Forums, "Memory Stick Failed IO Superblock", posted Nov. 11, 2009.
Super User Forums, "SD Card Failure, can't read superblock", posted Aug. 8, 2010.
U.S. Appl. No. 12/987,174, filed Jan. 10, 2011.
U.S. Appl. No. 12/987,175, filed Jan. 10, 2011.
U.S. Appl. No. 12/963,649, filed Dec. 9, 2010.
U.S. Appl. No. 13/021,754, filed Feb. 6, 2011.
Wei, L., "Trellis-Coded Modulation With Multidimensional Constellations", IEEE Transactions on Information Theory, vol. IT-33, No. 4, pp. 483-501, Jul. 1987.
U.S. Appl. No. 13/114,049 Official Action dated Sep. 12, 2011.
U.S. Appl. No. 12/405,275 Official Action dated Jul. 29, 2011.
Conway et al., "Sphere Packings, Lattices and Groups", 3rd edition, chapter 4, pp. 94-135, Springer, New York, USA 1998.
Chinese Patent Application # 200780040493.X Official Action dated Jun. 15, 2011.
U.S. Appl. No. 12/037,487 Official Action dated Oct. 3, 2011.
U.S. Appl. No. 12/649,360 Official Action dated Aug. 9, 2011.
U.S. Appl. No. 13/192,504, filed Jul. 28, 2011.
U.S. Appl. No. 13/192,852, filed Aug. 2, 2011.
U.S. Appl. No. 13/231,963, filed Sep. 14, 2011.
U.S. Appl. No. 13/239,408, filed Sep. 22, 2011.
U.S. Appl. No. 13/239,411, filed Sep. 22, 2011.
U.S. Appl. No. 13/214,257, filed Aug. 22, 2011.
U.S. Appl. No. 13/192,501, filed Jul. 28, 2011.
U.S. Appl. No. 13/192,495, filed Jul. 28, 2011.
U.S. Appl. No. 12/323,544 Official Action dated Mar. 9, 2012.
Chinese Patent Application # 200780026181.3 Official Action dated Mar. 7, 2012.
Chinese Patent Application # 200780026094.8 Official Action dated Feb. 2, 2012.
U.S. Appl. No. 12/332,370 Official Action dated Mar. 8, 2012.
U.S. Appl. No. 12/579,432 Official Action dated Feb. 29, 2012.
U.S. Appl. No. 12/522,175 Official Action dated Mar. 27, 2012.
U.S. Appl. No. 12/607,085 Official Action dated Mar. 28, 2012.
Budilovsky et al., "Prototyping a High-Performance Low-Cost Solid-State Disk", SYSTOR—The 4th Annual International Systems and Storage Conference, Haifa, Israel, May 30-Jun. 1, 2011.
NVM Express Protocol, "NVM Express", Revision 1.0b, Jul. 12, 2011.
SCSI Protocol, "Information Technology—SCSI Architecture Model—5 (SAM-5)", INCITS document T10/2104-D, revision 01, Jan. 28, 2009.
SAS Protocol, "Information Technology—Serial Attached SCSI—2 (SAS-2)", INCITS document T10/1760-D, revision 15a, Feb. 22, 2009.
U.S. Appl. No. 12/534,898 Official Action dated Mar. 23, 2011.
U.S. Appl. No. 13/047,822, filed Mar. 15, 2011.
U.S. Appl. No. 13/069,406, filed Mar. 23, 2011.
U.S. Appl. No. 13/088,361, filed Apr. 17, 2011.
US 7,161,836, 01/2007, Wan et al. (withdrawn)

* cited by examiner

ADAPTIVE OVER-PROVISIONING IN MEMORY SYSTEMS

CROSS-REFERENCE TO RELATED APPLICATIONS

This application claims the benefit of U.S. Provisional Patent Application 61/224,897, filed Jul. 12, 2009, U.S. Provisional Patent Application 61/293,814, filed Jan. 11, 2010, and U.S. Provisional Patent Application 61/334,606, filed May 14, 2010, whose disclosures are incorporated herein by reference.

FIELD OF THE INVENTION

The present invention relates generally to memory devices, and particularly to methods and systems for memory over-provisioning.

BACKGROUND OF THE INVENTION

Several types of memory devices, such as Flash memories, use arrays of analog memory cells for storing data. Each analog memory cell stores a quantity of an analog value, also referred to as a storage value, such as an electrical charge or voltage. This analog value represents the information stored in the cell. In Flash memories, for example, each analog memory cell holds a certain amount of electrical charge. The range of possible analog values is typically divided into intervals, each interval corresponding to one or more data bit values. Data is written to an analog memory cell by writing a nominal analog value that corresponds to the desired bit or bits.

Some memory devices, commonly referred to as Single-Level Cell (SLC) devices, store a single bit of information in each memory cell, i.e., each memory cell can be programmed to assume either of two possible programming levels. Higher-density devices, often referred to as Multi-Level Cell (MLC) devices, store two or more bits per memory cell, i.e., can be programmed to assume more than two possible programming levels.

SUMMARY OF THE INVENTION

An embodiment of the present invention that is described herein provides a method for data storage, including:

in a memory that includes multiple memory blocks, specifying at a first time a first over-provisioning overhead, and storing data in the memory while retaining in the memory blocks memory areas, which do not hold valid data and whose aggregated size is at least commensurate with the specified first over-provisioning overhead;

compacting portions of the data from one or more previously-programmed memory blocks containing one or more of the retained memory areas; and at a second time subsequent to the first time, specifying a second over-provisioning overhead that is different from the first over-provisioning overhead, and continuing to store the data and compact the data portions while complying with the second over-provisioning overhead.

In some embodiments, storing the data at the first time includes encoding the data with an Error Correction Code (ECC) having a given redundancy level and storing the encoded data, and specifying the second over-provisioning overhead includes modifying the given redundancy level of the ECC. In another embodiment, storing the data at the first time includes encoding the data with an Error Detection Code (EDC) having a given size and storing the encoded data, and specifying the second over-provisioning overhead includes modifying the given size of the EDC.

In some embodiments, each memory block includes multiple memory cells, storing the data at the first time includes programming the data at a given number of bits per cell, and specifying the second over-provisioning overhead includes modifying the given number of bits per cell. In an embodiment, modifying the given number of bits per cell includes modifying a number of programming levels that are used for programming the memory cells. In another embodiment, modifying the given number of bits per cell includes modifying a coding rate of an Error Correction Code (ECC) that is used for encoding the data.

In yet another embodiment, storing the data at the first time includes storing N pages in a given memory block, and continuing to store the data at the second time includes storing M pages in the given block, M≠N. In still another embodiment, specifying the first and second over-provisioning overheads includes compressing the data and storing the compressed data at one of the first and second times, and storing the data without compression at the other of the first and second times.

In some embodiments, specifying the second over-provisioning overhead includes evaluating a predefined adaptation criterion with respect to at least some of the memory blocks, and setting the second over-provisioning overhead responsively to meeting the adaptation criterion. Evaluating the adaptation criterion may includes assessing a wear level of the at least some of the memory blocks, assessing an expected number of errors in the at least some of the memory blocks, and/or assessing a target storage reliability of the data in the at least some of the memory blocks. In an embodiment, the adaptation criterion depends on a preference between programming speed and a capacity of the memory. In another embodiment, the adaptation criterion depends on a frequency at which the data in the at least some of the memory blocks changes.

In a disclosed embodiment, storing the data includes accepting the data from a host for storage in a long-term storage device, and temporarily caching the data in the memory. Specifying the second over-provisioning overhead may include receiving from the host a request to free cache memory resources, and setting the second over-provisioning overhead in response to the request. In an embodiment, the data is received from a host for storage in the memory, the memory has a specified user capacity that is available to the host, and specifying the second over-provisioning overhead does not change the specified user capacity. In another embodiment, specifying the second over-provisioning overhead includes accepting an indication whether a data item that is stored in the memory is also stored in an additional storage location, and setting the second over-provisioning overhead responsively to the indication.

In yet another embodiment, the memory includes multiple memory devices each holding a subset of the memory blocks, and specifying the first and second over-provisioning overheads includes assigning one of the memory devices to serve as a spare memory device for replacing a faulty memory device, and, until the spare memory device replaces the faulty memory device, using the spare memory device to increase the first over-provisioning overhead. In still another embodiment, the memory includes multiple memory portions each holding a subset of the memory blocks, and specifying the first over-provisioning overhead includes individually specifying respective values of the first over-provisioning overhead separately for the memory portions. Specifying the respective values of the over-provisioning overhead may include setting a respective value of the first over-provisioning overhead for a given memory portion based on an expected endurance of the given memory portion.

In some embodiments, the memory includes multiple memory devices each holding a subset of the memory blocks, specifying the first over-provisioning overhead at the first time includes assigning each memory device a respective range of logical addresses, and specifying the second over-provisioning overhead at the second time includes re-assigning the logical addresses among the memory devices in response to a failure of a given memory device. In an embodiment, the memory includes multiple memory devices that are grouped in two or more groups, specifying the first over-provisioning ratio includes individually specifying respective values of the first over-provisioning overhead for the groups, and the method further includes selecting, responsively to the values, one of the groups for storing an input data item, and storing the input data item in the selected group.

In a disclosed embodiment, storing the data at the first time includes storing a first portion of the data at a first storage density and a second portion of the data at a second storage density that is different from the first storage density, and specifying the second over-provisioning ratio includes, at the second time, modifying a ratio between the first and second portions of the data. Storing the data may include storing frequently-changing data at the first storage density, and rarely-changing data at the second storage density. In an embodiment, compacting the portions of the data includes selecting the previously-programmed memory blocks for compaction based on an estimated endurance of the blocks.

There is additionally provided, in accordance with an embodiment of the present invention, a method for data storage, including:

in a memory that includes multiple memory blocks, pre-defining a range of logical addresses for storing data in the memory;

defining a number of physical storage locations in the memory blocks, such that data storage in the number of the physical storage locations retains in the memory blocks memory areas that do not hold valid data and whose aggregated size is at least commensurate with an initial over-provisioning overhead;

at a first time, storing the data in the memory by mapping the logical addresses to the number of the physical storage locations, while complying with the initial over-provisioning overhead, and compacting portions of the data from one or more previously-programmed memory blocks containing one or more of the retained memory areas; and at a second time subsequent to the first time, defining a modified over-provisioning overhead that is different from the initial over-provisioning overhead, modifying the number of the physical storage locations so as to comply with the modified over-provisioning overhead, and continuing to store the data by mapping the logical addresses to the modified number of the physical storage locations and compacting the data portions.

In some embodiments, defining and modifying the number of physical storage locations include applying a mapping process, which maps between the logical addresses and the physical storage locations and which varies in accordance with the over-provisioning overhead. Applying the mapping process may include defining a data structure for holding a mapping between the logical addresses and the physical storage locations, and modifying at least one of a size of the data structure and a variable range of the data structure in accordance with the over-provisioning overhead.

There is also provided, in accordance with an embodiment of the present invention, apparatus for data storage, including:

a memory, including multiple memory blocks; and a processor, which is configured to specify at a first time a first over-provisioning overhead and store data in the memory while retaining in the memory blocks memory areas, which do not hold valid data and whose aggregated size is at least commensurate with the specified first over-provisioning overhead, to compact portions of the data from one or more previously-programmed memory blocks containing one or more of the retained memory areas, and, at a second time subsequent to the first time, to specify a second over-provisioning overhead that is different from the first over-provisioning overhead and to continue to store the data and compact the data portions while complying with the second over-provisioning overhead.

There is further provided, in accordance with an embodiment of the present invention, apparatus for data storage, including:

a memory, including multiple memory blocks; and a processor, which is configured to predefine a range of logical addresses for storing data in the memory, to define a number of physical storage locations in the memory blocks, such that data storage in the number of the physical storage locations retains in the memory blocks memory areas that do not hold valid data and whose aggregated size is at least commensurate with an initial over-provisioning overhead, to store data in the memory at a first time by mapping the logical addresses to the number of the physical storage locations, while complying with the initial over-provisioning overhead, and compacting portions of the data from one or more previously-programmed memory blocks containing one or more of the retained memory areas, and, at a second time subsequent to the first time, to define a modified over-provisioning overhead that is different from the initial over-provisioning overhead, to modify the number of the physical storage locations so as to comply with the modified over-provisioning overhead, and to continue to store the data by mapping the logical addresses to the modified number of the physical storage locations and compact the data portions.

There is also provided, in accordance with an embodiment of the present invention, apparatus for data storage, including:

an interface, which is configured to communicate with a memory that includes multiple memory blocks; and a processor, which is configured to specify at a first time a first over-provisioning overhead and store data in the memory while retaining in the memory blocks memory areas, which do not hold valid data and whose aggregated size is at least commensurate with the specified first over-provisioning overhead, to compact portions of the data from one or more previously-programmed memory blocks containing one or more of the retained memory areas, and, at a second time subsequent to the first time, to specify a second over-provisioning overhead that is different from the first over-provisioning overhead, and to continue to store the data and compact the data portions while complying with the second over-provisioning overhead.

There is additionally provided, in accordance with an embodiment of the present invention, apparatus for data storage, including:

an interface, which is configured to communicate with a memory that includes multiple memory blocks; and a processor, which is configured to predefine a range of logical addresses for storing data in the memory, to define a number of physical storage locations in the memory blocks, such that data storage in the number of the physical storage locations retains in the memory blocks memory areas that do not hold valid data and whose aggregated size is at least commensurate with an initial over-provisioning overhead, to store data in the memory at a first time by mapping the logical addresses to the number of the physical storage locations, while complying with the initial over-provisioning overhead, and compacting portions of the data from one or more previously-programmed memory blocks containing one or more of the retained memory areas, and, at a second time subsequent to the first time, to define a modified over-provisioning overhead that is different from the initial over-provisioning overhead, to modify the number of the physical storage locations so as to comply with the modified over-provisioning overhead, and to continue to store the data by mapping the logical addresses to the modified number of the physical storage locations and compacting the data portions.

The present invention will be more fully understood from the following detailed description of the embodiments thereof, taken together with the drawings in which:

DETAILED DESCRIPTION OF EMBODIMENTS

Overview

Figure 1:
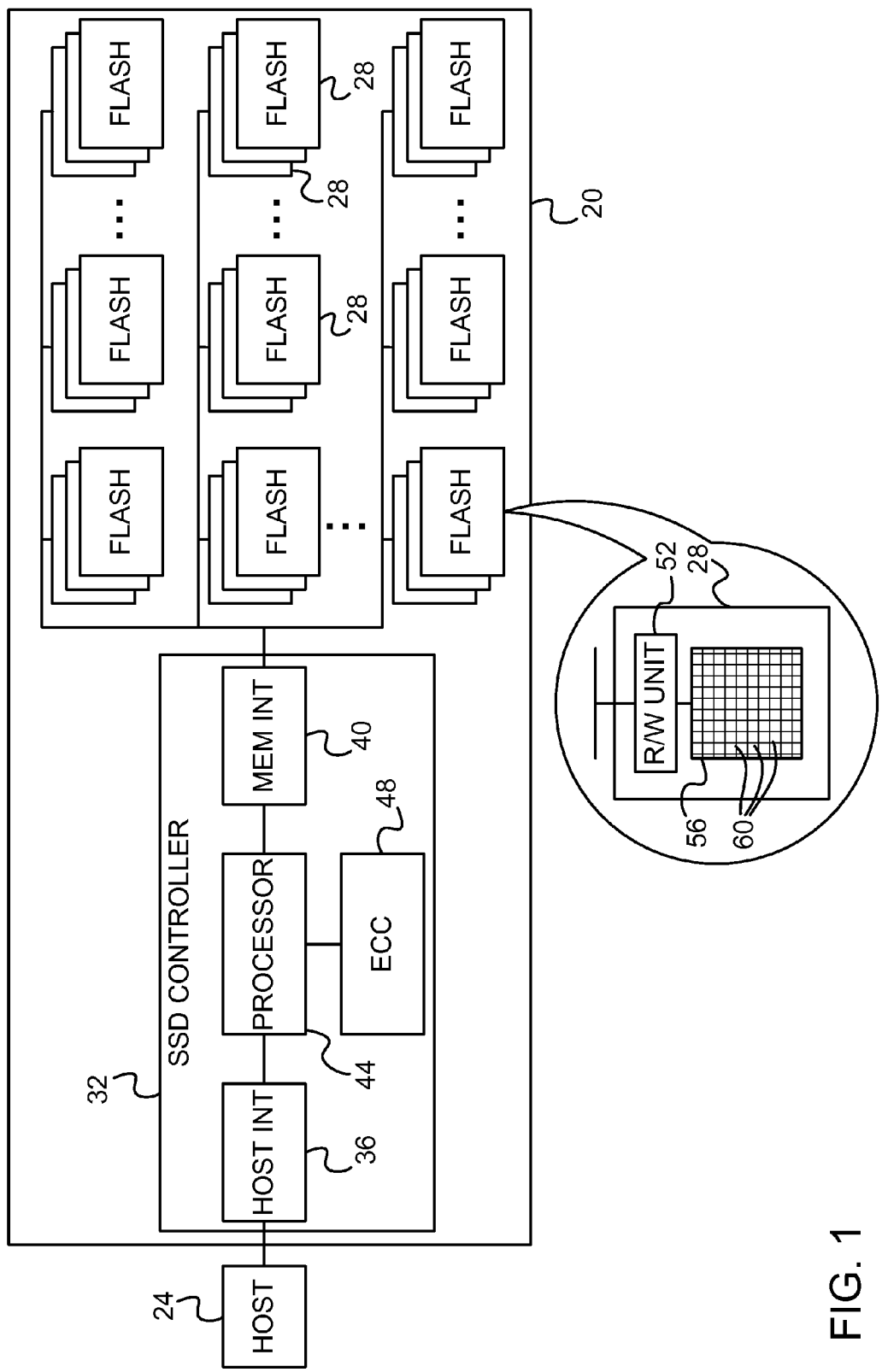
FIG. 1 is a block diagram that schematically illustrates a memory system, in accordance with an embodiment of the present invention.

In some types of non-volatile memory, such as NAND Flash memory, memory cells need to be erased before they can be programmed with new data. Erasure of memory cells is typically performed in blocks. As a result, modifying a single page or even a single bit may involve erasure and subsequent programming of an entire block, which can sometimes hold 1 MB of data or more. Some memory systems overcome this problem by using logical addressing. In such a system, when a page having a certain logical address is modified, the modified page is stored in a new physical location in another block, and the previous physical location of the page is marked as not holding valid data. As data storage progresses over time, more and more areas that do not hold valid data (and are therefore ready for erasure) appear as "holes" in the memory blocks. The system typically employs a "garbage collection" process, which compacts valid data from one or more partially-programmed blocks and creates empty blocks that are available for erasure and new programming.

In order to increase the efficiency of the garbage collection process, the memory system is often over-provisioned in terms of memory size. In other words, the actual physical storage capacity of the system is larger than the specified logical capacity available to a host. The aggregated size of the memory areas that do not hold valid data ("holes") is referred to as an over-provisioning overhead. The over-provisioning overhead can be specified as an over-provisioning ratio, which is defined as a fraction of the specified system capacity. For example, when the system uses an over-provisioning ratio of 5% and the memory is full from the host's perspective, each memory block is only 95% programmed, on average.

When the system is over-provisioned, garbage collection can be performed more efficiently. In other words, the number of copy operations per block compaction or consolidation can be reduced. The efficiency of the garbage collection process increases as a function of the over-provisioning ratio used in the system. Thus, increasing the over-provisioning ratio reduces the wearing of memory cells, and also increases the programming throughput. The effect of the over-provisioning overhead on cell wearing and storage throughput is particularly strong when the memory is full or nearly full.

Embodiments of the present invention that are described herein provide improved methods and systems for data storage. In some embodiments, a memory system comprises a processor, which accepts data from a host and stores the data in a memory comprising multiple memory blocks. The embodiments described herein refer mainly to Solid State Disks (SSDs), but the disclosed methods can also be used in various other types of memory systems.

In some embodiments, the processor modifies the over-provisioning overhead in an adaptive manner, so as to optimize the system performance for given circumstances. Typically, the processor specifies and applies a certain over-provisioning overhead, evaluates a predefined adaptation criterion, and changes the over-provisioning overhead (i.e., specifies a different over-provisioning overhead) if the criterion is met. Several example criteria are described herein. The adaptation criterion may consider, for example, the wear level and/or health level of the memory blocks. As another example, the adaptation criterion may depend on whether the stored data is critical or non-critical, or whether the data in question is already backed-up elsewhere.

Several example techniques for modifying the over-provisioning overhead are described herein. For example, when the stored data is first encoded with an Error Correction Code (ECC), the processor may trade between memory space allocated to ECC redundancy bits and memory space available for over-provisioning. As another example, the storage density (number of bits per cell) used for storing the data can be changed, thereby increasing or decreasing the memory space available for over-provisioning. As yet another example, the processor may trade between data compression and over-provisioning overhead. In some embodiments that are described herein, adaptive over-provisioning is applied in a memory system that serves as cache memory for a long-term storage device.

In some embodiments, the processor stores data in the memory using logical-to-physical address mapping. In these embodiments, the processor stores the data by mapping a predefined range of logical addresses to a certain number of physical storage locations in the memory blocks. In some embodiments, the processor modifies the over-provisioning overhead by modifying the number of physical storage locations without modifying the range of logical addresses.

In an example implementation, the processor decreases the over-provisioning overhead over the lifetime of the memory system. At the beginning of the system's life, the memory blocks are still fresh, and the number of read errors is expected to be small. Therefore, data can be stored with modest ECC redundancy, and more memory resources can be made available for over-provisioning. After the memory undergoes heavy cycling, e.g., after a number of years, higher ECC redundancy may be needed to achieve the desired storage reliability. The over-provisioning overhead can be reduced to enable the higher ECC redundancy. The disclosed techniques enable the system to achieve the highest possible storage throughput for the present conditions, or to achieve any other desired performance trade-off.

System Description

FIG. 1 is a block diagram that schematically illustrates a memory system 20, in accordance with an embodiment of the present invention. System 20 accepts data for storage from a host 24 and stores it in memory, and retrieves data from memory and provides it to the host. In the present example, system 20 comprises a Solid-State Disk (SSD) that stores data for a host computer. In alternative embodiments, however, system 20 may be used in any other suitable application and with any other suitable host, such as in computing devices, cellular phones or other communication terminals, removable memory modules such as Disk-On-Key (DOK) devices, Secure Digital (SD) cards, Multi-Media Cards (MMC) and embedded MMC (eMMC), digital cameras, music and other media players and/or any other system or device in which data is stored and retrieved.

System 20 comprises multiple memory devices 28, each comprising multiple analog memory cells. In the present example, devices 28 comprise non-volatile NAND Flash devices, although any other suitable memory type, such as NOR and Charge Trap Flash (CTF) Flash cells, phase change RAM (PRAM, also referred to as Phase Change Memory—PCM), Nitride Read Only Memory (NROM), Ferroelectric RAM (FRAM), magnetic RAM (MRAM) and/or Dynamic RAM (DRAM) cells, can also be used. Each memory device may comprise a packaged device or an unpackaged semiconductor chip or die. A typical SSD may comprise several devices, each providing a storage space of 4 GB. Generally, however, system 20 may comprise any suitable number of memory devices of any desired type and size. Although the system configuration of FIG. 1 comprises multiple memory devices, the methods and systems described herein can also be used in systems having only a single memory device.

System 20 comprises an SSD controller 32, which accepts data from host 24 and stores it in memory devices 28, and retrieves data from the memory devices and provides it to the host. SSD controller 32 comprises a host interface 36 for communicating with host 24, a memory interface 40 for communicating with memory devices 28, and a processor 44 that processes the stored and retrieved data. In particular, processor 44 carries out adaptive over-provisioning schemes that are described in detail below. In some embodiments, controller 32 encodes the stored data with an Error Correction Code (ECC). In these embodiments, controller 32 comprises an ECC unit 48, which encodes the data before stored in devices 28 and decodes the ECC of data retrieved from devices 28.

Each memory device 28 comprises a memory cell array 56. The memory array comprises multiple analog memory cells 60. In the context of the present patent application and in the claims, the term "analog memory cell" is used to describe any memory cell that holds a continuous, analog value of a physical parameter, such as an electrical voltage or charge. Any suitable type of analog memory cells, such as the types listed above, can be used. In the present example, each memory device 28 comprises a non-volatile memory of NAND Flash cells.

The charge levels stored in the cells and/or the analog voltages or currents written into and read out of the cells are referred to herein collectively as analog values or storage values. Although the embodiments described herein mainly address threshold voltages, the methods and systems described herein may be used with any other suitable kind of storage values.

System 20 stores data in the analog memory cells by programming the cells to assume respective memory states, which are also referred to as programming levels. The programming levels are selected from a finite set of possible levels, and each level corresponds to a certain nominal storage value. For example, a 2 bit/cell MLC can be programmed to assume one of four possible programming levels by writing one of four possible nominal storage values into the cell.

In the present example, each memory device 28 comprises a reading/writing (R/W) unit 52, which accepts data for storage from SSD controller 32, converts the data into analog storage values and writes them into memory cells 60 of that memory device. When reading data out of array 56, R/W unit 52 typically converts the storage values of memory cells 60 into digital samples having a resolution of one or more bits, and provides the digital samples to controller 32. Data is typically written to and read from the memory cells in groups that are referred to as pages. In some embodiments, the R/W unit can erase a group of cells 60 by applying one or more negative erasure pulses to the cells.

SSD controller 32, and in particular processor 44, may be implemented in hardware. Alternatively, the SSD controller may comprise a microprocessor that runs suitable software, or a combination of hardware and software elements. In some embodiments, processor 44 comprises a general-purpose processor, which is programmed in software to carry out the functions described herein. The software may be downloaded to the processor in electronic form, over a network, for example, or it may, alternatively or additionally, be provided and/or stored on tangible media, such as magnetic, optical, or electronic memory.

The configuration of FIG. 1 is an exemplary system configuration, which is shown purely for the sake of conceptual clarity. Any other suitable memory system configuration can also be used. Elements that are not necessary for understanding the principles of the present invention, such as various interfaces, addressing circuits, timing and sequencing circuits and debugging circuits, have been omitted from the figure for clarity.

In the exemplary system configuration shown in FIG. 1, memory devices 28 and SSD controller 32 are implemented as separate Integrated Circuits (ICs). In alternative embodiments, however, the memory devices and the SSD controller may be integrated on separate semiconductor dies in a single Multi-Chip Package (MCP) or System on Chip (SoC), and may be interconnected by an internal bus. Further alternatively, some or all of the SSD controller circuitry may reside on the same die on which one or more of the memory devices are disposed. Further alternatively, some or all of the functionality of SSD controller 32 can be implemented in software and carried out by a processor or other element of the host system, or by any other type of memory controller. In some embodiments, host 24 and SSD controller 32 may be fabricated on the same die, or on separate dies in the same device package.

In an example configuration, memory cells 60 in a given array 56 are arranged in multiple rows and columns. The memory cells in each row are connected by word lines, and the memory cells in each column are connected by bit lines. The memory array is typically divided into multiple pages, i.e., groups of memory cells that are programmed and read simultaneously. Pages are sometimes sub-divided into sectors. In some embodiments, each page comprises an entire row of the array. In alternative embodiments, each row (word line) can be divided into two or more pages. For example, in some devices each row is divided into two pages, one comprising the odd-order cells and the other comprising the even-order cells. In a typical implementation, a two-bit-per-cell memory device may have four pages per row, a three-bit-per-cell memory device may have six pages per row, and a four-bit-per-cell memory device may have eight pages per row.

Erasing of cells is usually carried out in blocks that contain multiple pages. Typical memory devices may comprise several thousand erasure blocks (also referred to as memory blocks or simply blocks, for brevity). In a typical two-bit-per-cell MLC device, each erasure block is on the order of 32 or 64 word lines, each comprising hundreds of thousands of memory cells. Each word line of such a device is often partitioned into four pages (odd/even order cells, least/most significant bit of the cells). Three-bit-per cell devices having 32 word lines per erasure block would have 192 pages per erasure block, and four-bit-per-cell devices would have 256 pages per block. Alternatively, other block sizes and configurations can also be used.

Some memory devices comprise two or more separate memory cell arrays, often referred to as planes. Since each plane has a certain "busy" period between successive write operations, data can be written alternately to the different planes in order to increase programming speed.

Adaptive Over-Provisioning of Memory Space

System 20 has a certain total (physical) capacity that memory devices 28 are capable of storing. Some of this total capacity is used for storing user data bits, i.e., data that is accepted for storage from host 24. Other portions of the total capacity may be used for other purposes, e.g., for storing information that is produced internally to system 20. For example, when the stored data is encoded with an ECC, some of the total capacity is used for storing redundancy bits of the ECC, produced by ECC unit 48. Additionally or alternatively, portions of the total capacity of system 20 can be used for storing any other suitable kind of information in addition to user data received from the host. Typically, host 24 is aware only of the specified user capacity of system 20 (e.g., the logical address space used for accessing the memory), and the remaining memory resources are hidden and not available to the host. In other words, the size of the address space available to the host for storing data in system 20 is the user capacity.

In system 20, the actual memory space that is used for storing data is larger than the specified (logical) capacity of the system. When storing data in the different memory blocks of system 20, processor 44 retains in the memory blocks some memory areas that do not hold valid data. The aggregated size of these memory areas (also referred to as "holes") is referred to as over-provisioning overhead. The over-provisioning overhead is typically expressed as an over-provisioning ratio, which is defined as a fraction of the specified logical system capacity. As explained above, the memory holes are often created when logical data pages are updated and therefore stored in other blocks.

The term "valid data" refers to any data that is useful in subsequent operation of the system. Valid data may comprise, for example, user data, ECC redundancy bits, and/or metadata or other information generated by the system. Thus, a memory area that does not hold any sort of valid data can be considered ready for erasure. Erasure of a memory area that does not hold valid data will not cause damage to any information that is stored in the system. For example, an area of this sort may hold older, obsolete versions of logical pages that were updated and stored in other physical locations.

The memory areas that do not hold valid data are typically distributed among the different memory blocks of the system. For example, when system 20 operates at an over-provisioning ratio of 5% and the memory is fully-programmed from the point of view of the host, only 95% of the pages in each memory block are actually programmed with valid data, on average. The exact percentage may vary from block to block, but on average, 5% of the pages in each block do not hold valid data. The over-provisioning overhead enables system 20 to maintain a pool of memory blocks that are (or can be) erased and ready for programming, by compacting or consolidating partially-filled memory blocks. In some embodiments, processor 44 modifies the over-provisioning ratio (i.e., modifies the aggregate size of the memory holes remaining in the memory blocks) in an adaptive manner, as will be explained in detail below.

Figure 2:
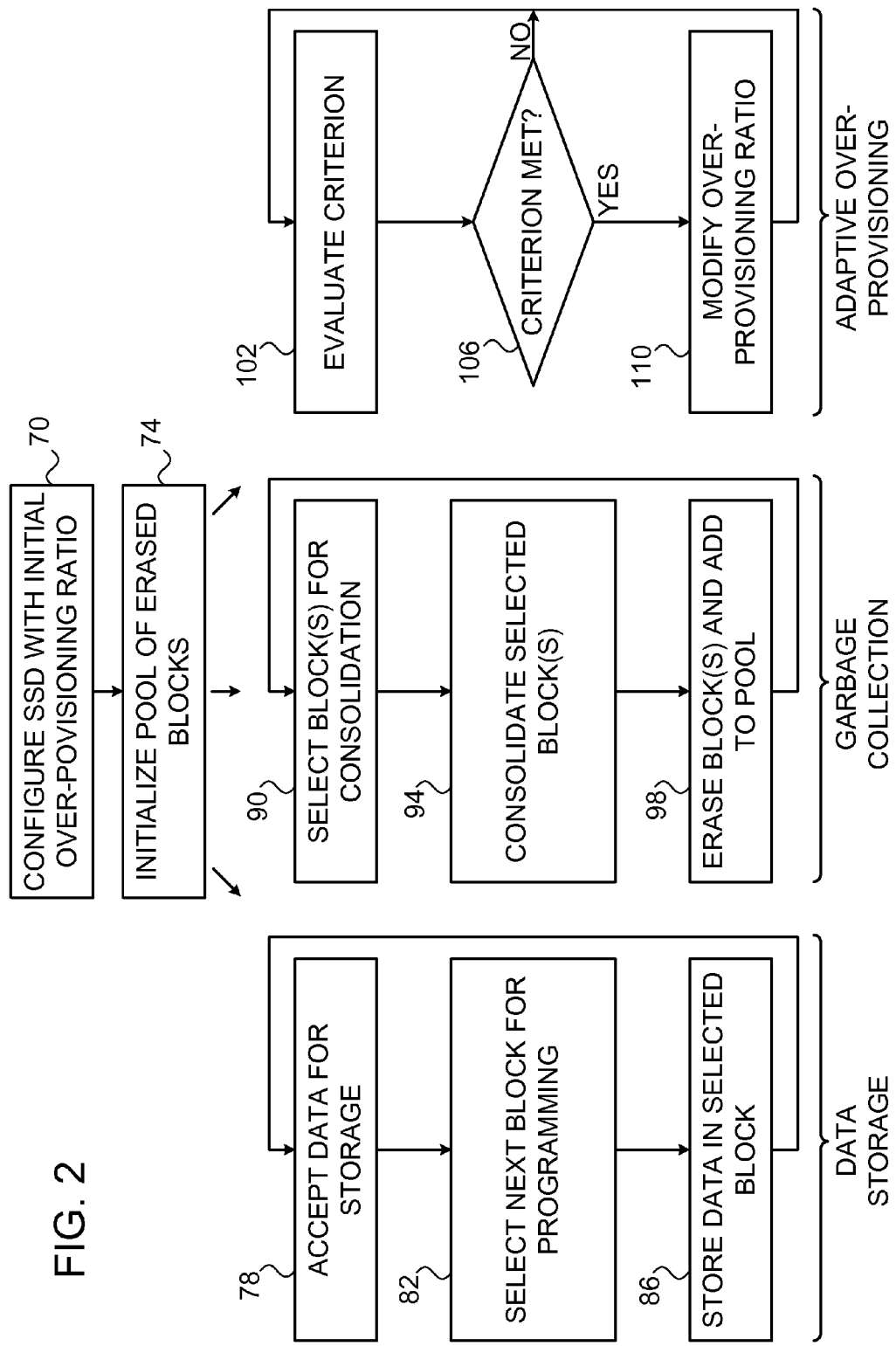
FIG. 2 is a flow chart that schematically illustrates a method for operating a memory, in accordance with an embodiment of the present invention.

FIG. 2 is a flow chart that schematically illustrates a method for storing data in memory devices 28 using adaptive over-provisioning, in accordance with an embodiment of the present invention. At initialization, processor 44 configures system 20 with a certain initial over-provisioning ratio, at an over-provisioning initialization step 70. A typical range of over-provisioning ratios is on the order of 5%-25%, although any other suitable value can also be used. Processor 44 initializes a certain set, or pool, of memory blocks that are erased and ready for programming, at a block initialization step 74. At this stage, system 20 is ready for storing data.

As noted above, memory devices 28 comprise multiple memory blocks, and each block comprises multiple pages. Programming is performed page by page, and erasure is performed en-bloc for each block. Thus, a given block may be empty (i.e., contain no valid data, such as immediately after erasure), fully-programmed (i.e., have all its pages programmed with valid data) or partially-programmed (i.e., have only part of its pages programmed with valid data). During operation, system 20 continually carries out three processes, namely data storage, garbage collection and adaptive over-provisioning. These processes are typically performed independently of one another, as shown in FIG. 2, although the performance of each process often affects the other processes.

In the storage process, processor 44 accepts data for storage from the host, and stores it in one or more selected memory blocks. Processor 44 accepts from host 24 user data for storage, at a user data input step 78. Processor 44 processes the user data, e.g., encodes the data with an ECC using ECC unit 48 and/or adds other sorts of management information. Processor 44 selects a given block for storing the data, at a next block selection step 82. Any suitable selection criteria can be used for this purpose. In some cases, processor 44 may select a block from the pool of erased blocks, i.e., a block that currently contains no data. In other cases, processor 44 may select a block that is partially-programmed but has sufficient space for storing the data in question. In other cases, processor 44 may select two or more blocks, either erased or partially-programmed, for storing the data. Processor 44 then stores the data in the selected block, at a storage step 86.

Note that the data storage process may produce blocks that are fragmented and partially-programmed, since when a certain logical page is updated, the previous version of the page becomes invalid and therefore fragments the block in which it is stored. The extent of partial programming and data fragmentation may depend, for example, on the kind of data programming by the host (e.g., sequential vs. random programming) and on the block selection criteria used by processor 44. Deletion of data by the host also contributes to data fragmentation and partial programming of blocks.

In the garbage collection process, processor 44 compacts portions of valid data from one or more partially-programmed blocks, so as to clear blocks for erasure. In an example embodiment, processor 44 selects two or more blocks for consolidation, at a consolidation selection step 90. Processor 90 may use any suitable selection criteria for this purpose. For example, the processor may select the most fragmented blocks, the blocks whose consolidation is closest to producing a fully-programmed block, or make any other suitable selection. Processor 44 consolidates the selected blocks, at a consolidation step 94. Consolidation is typically performed by copying the data from the selected block to one or more new blocks obtained from the pool of erased blocks. Alternatively, data can be copied from one of the selected blocks into non-programmed pages in another selected block. In yet another embodiment, a single block is selected for compaction, and its valid data is copied to another block. Processor 44 then erases the block or blocks whose data was copied elsewhere, at an erasure step 98. Processor 44 adds these blocks to the pool of erased blocks that are available for programming.

Note that the efficiency of the garbage collection (block compaction) process and the data storage process depends on the amount of over-provisioning overhead used in system 20. Consider, for example, a scenario in which the system uses a 5% over-provisioning ratio. In this case, if a fully-programmed block contains M bits, the system stores 5000·M bits of data in $5000/0.95 \cong 5263$ memory blocks instead of 5000. When the memory is full from the host's perspective, the memory blocks in system 20 are actually 95% programmed, on average. In this situation, clearing partially-programmed blocks by compaction involves a relatively high number of copy operations.

In contrast, consider another scenario in which the system uses a 15% over-provisioning ratio, i.e., assigns $5000/0.855 \cong 882$ blocks for storing the 5000·M bits of data. In this scenario, when the memory is full from the host's perspective, the memory blocks are only 85% programmed, on average. Consolidating and clearing partially-programmed blocks in this scenario incurs a much smaller number of copy operations than in the former scenario of 5% over-provisioning.

Generally, the average number of additional programming operations needed per each write operation (also referred to as "write amplification") decreases with the over-provisioning ratio. Increasing the over-provisioning ratio increases the storage throughput of the system, at the expense of larger memory. In addition, a larger over-provisioning ratio increases the lifetime of the memory, reduces the power consumption of the storage process and reduces cell wearing, since it reduces the number of copy operations performed in block compaction. Decreasing the over-provisioning ratio, on the other hand, uses less memory space at the expense of degraded storage throughput, memory lifetime, power consumption and cell wearing.

In some embodiments, processor 44 adaptively modifies the over-provisioning overhead used in system 20, in order to optimize the system performance for given circumstances. In other words, processor 44 sets a certain over-provisioning ratio at a given point in time, and another over-provisioning ratio at a different point in time, based on a certain adaptation criterion. Typically, processor 44 evaluates the adaptation criterion, at a criterion evaluation step 102. Processor 44 checks whether the criterion is met, at a criterion checking step 106. If the criterion is met, processor 44 modifies the over-provisioning ratio, at an over-provisioning adaptation step 110.

Processor 44 may use any suitable criterion in order to decide when, and to what extent, to modify the over-provisioning ratio. The criterion is typically defined over at least some of the memory blocks. The criterion may consider, for example, the number of Programming and Erasure (P/E) cycles that the blocks have gone through or any other suitable measure of the wear level of the blocks. Additionally or alternatively, the criterion may consider the health level of the blocks, e.g., the likelihood of encountering data errors in the storage and retrieval process. As another example, processor 44 changes the over-provisioning ratio as a result of a system preference. For example, at a certain time it may be preferable to increase programming speed at the expense of capacity, in which case the processor sets a relatively high over-provisioning ratio is appropriate. At another time it may be preferable to increase capacity at the expense of programming speed, in which case the processor sets a relatively low over-provisioning ratio. Additionally or alternatively, any other suitable criterion can be used.

In some embodiments, processor 44 trades-off the amount of over-provisioning with the amount of ECC redundancy. In other words, processor 44 may divide the total storage capacity of system 20 between ECC redundancy and over-provisioning. For example, when the expected number of errors is relatively low (e.g., when the system is in the beginning of its life and the memory cells are not yet heavily cycled), processor 44 can define a relatively low ECC redundancy level (e.g., high ECC code rate) and assign more memory space for data storage at a higher over-provisioning ratio. When the average wear of the memory blocks increases, e.g., after several months or years of service or following a certain number of P/E cycles, processor 44 may decide to increase the ECC redundancy and therefore reduce the over-provisioning ratio. Note that the user capacity, as seen by the host, does not change throughout these adaptations.

Additionally or alternatively, processor 44 may modify the trade-off between ECC redundancy and over-provisioning ratio based on the required storage reliability of the data. When the specified storage reliability is low, processor 44 may reduce the ECC redundancy, and in return increase the over-provisioning ratio and improve the programming throughput. When the specified storage reliability is high, processor 44 may increase the ECC redundancy and decrease the over-provisioning ratio. Further additionally or alternatively, processor 44 may trade ECC redundancy vs. over-provisioning resources using any other suitable criterion.

Figure 3:
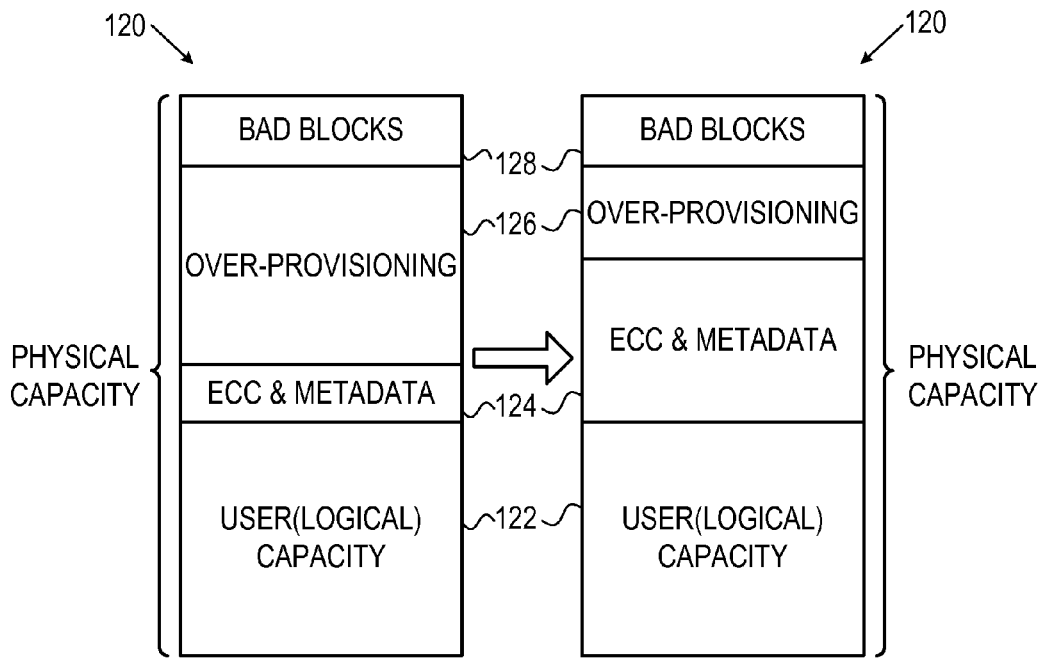
FIGS. 3-5 are diagrams that schematically illustrate adaptive over-provisioning schemes, in accordance with embodiments of the present invention.

FIG. 3 is a diagram that schematically illustrates an adaptive over-provisioning scheme, in accordance with an embodiment of the present invention. At any given point in time, processor 44 partitions a memory 120 between a user data storage area 122, an auxiliary storage area 124, an over-provisioning area 126 and a bad-block area 128. Area 122 is used for storing user data, and has a certain user (logical) capacity. Area 124 is used for storing information such as ECC redundancy, metadata and/or other auxiliary information. Area 126 is used for over-provisioning. Area 128 comprises blocks that are found to be faulty.

The left-hand-side of FIG. 3 shows a situation where, at a certain point in time, processor 44 sets a relatively low ECC redundancy level and a relatively large over-provisioning ratio. The right-hand-side of FIG. 3 illustrates a different point in time, at which processor 44 sets a relatively high ECC redundancy level and a relatively small over-provisioning ratio. Generally, processor 44 may increase and/or decrease the over-provisioning ratio over time, as appropriate.

The above-describe technique is also applicable to Error Detection Codes (EDC), either in addition to or instead of ECC. In alternative embodiments, processor 44 encodes the data for storage with a certain EDC, such as a Cyclic Redundancy Check (CRC) code. Processor 44 may set different trade-offs between EDC size (and thus error detection reliability) for over-provisioning overhead, i.e., increase the over-provisioning overhead while reducing EDC size (e.g., the number of bits allocated to EDC per page) or vice versa.

In alternative embodiments, processor 44 can modify the over-provisioning ratio by modifying the storage density per memory cell, i.e., the number of bits per cell. The storage density can be modified, for example, by modifying the number of programming levels (programming states) that are used for storing the data, and/or by modifying the ECC code rate. When using a larger number of bits per cell, a given data size can be stored in fewer memory pages, and more space can be used for over-provisioning.

Figure 4:
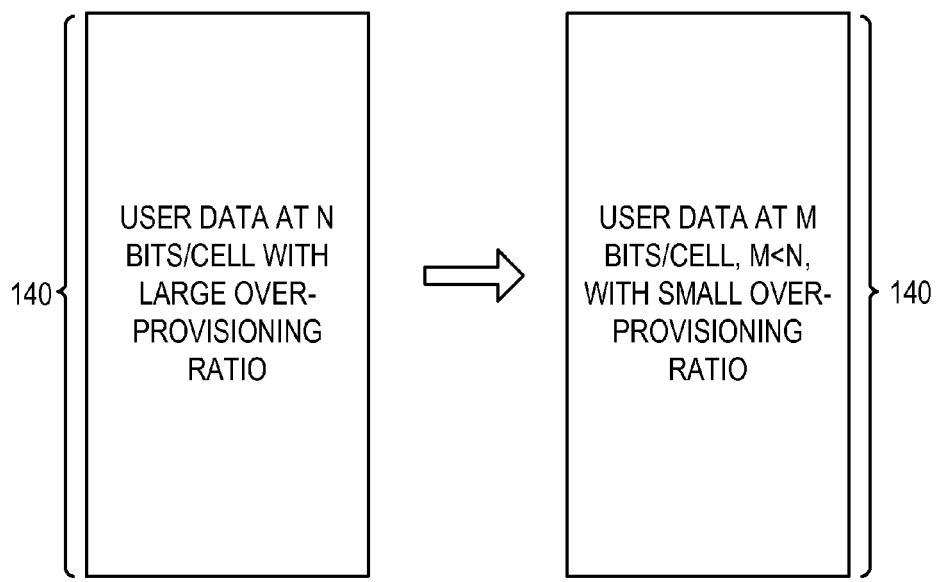

FIG. 4 is a diagram that schematically illustrates an adaptive over-provisioning scheme, in accordance with another embodiment of the present invention. In this example, system 20 is able to store data in a memory 140 at two or more different storage densities. FIG. 4 shows in which processor 44 supports at least two storage densities, denoted M and N bits/cell, wherein N>M. At a certain point in time, processor 44 stores the data at a density of N bits/cell, with a relatively large over-provisioning ratio. At a different point in time, processor 44 may decrease the storage density to M bits/cell, at the expense of having to decrease the over-provisioning ratio. Although the example of FIG. 4 shows a decrease in storage density over time, processor 44 may also increase the storage density over time, as appropriate.

In some embodiments, processor 44 modifies the over-provisioning ratio by modifying the number of programming levels that are used for storing data, at least for some of the word lines in some of the memory blocks. Processor 44 may increase or decrease the number of programming levels from any suitable initial number to any suitable modified number, such as from two levels to four levels, from four levels to eight levels, or vice versa.

Moreover, the initial and/or modified number of programming levels need not necessarily be a power of two. For example, processor 44 may initially store the data using eight programming levels (i.e., at a density of 3 bits/cell). At a later point in time, the processor may reduce the over-provisioning ratio by decreasing the number of programming levels to six, i.e., reducing the storage density to approximately 2.5 bits/cell. Alternatively, processor 44 may store data using three programming levels, or any other suitable number.

Figure 5:
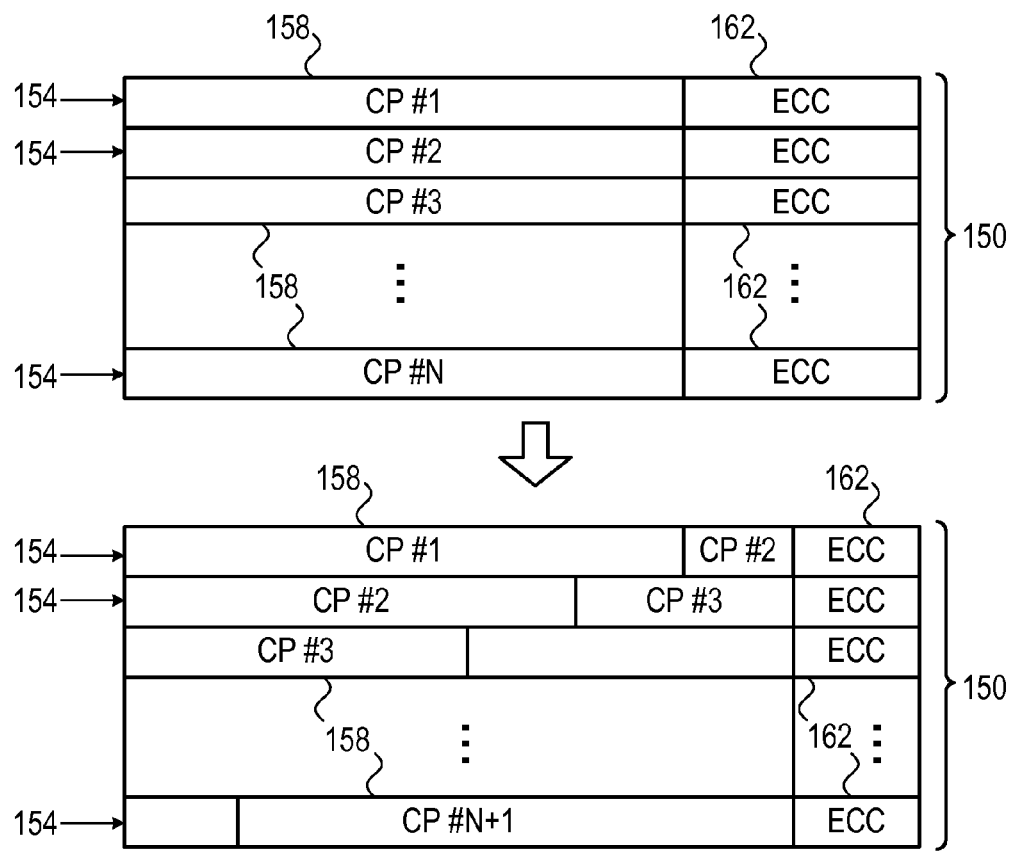

FIG. 5 is a diagram that schematically illustrates an adaptive over-provisioning scheme, in accordance with yet another embodiment of the present invention. In this embodiment, the data for storage is divided into controller pages 158, typically having a fixed size. FIG. 5 shows a memory block 150, which comprises N memory pages 154. At a certain point in time (shown at the top of the figure), each memory page holds a single controller page 158 and the corresponding ECC redundancy bits 162. In this configuration, block 150 can hold up to N controller pages.

At a different point in time, processor 44 reduces the ECC redundancy level, so that less memory cells in each memory page 154 are needed for storing ECC redundancy bits 162. As a result, more memory cells are available for increasing the over-provisioning ratio. For example, the bottom of FIG. 5 shows a scenario in which processor 44 stores N+1 controller pages 158 in the N memory pages 154, by using the extra space cleared by reducing the ECC redundancy. In this configuration, the N+1 controller pages are stored one after another in the available memory cells, regardless of memory page 154 boundaries. Thus, a given controller page 158 may be split between two different memory pages 154. When storing data in multiple blocks such as block 150, the higher number of controller pages per block enables memory 44 to store a given body of user data in fewer blocks, and therefore increase the over-provisioning ratio.

The example of FIG. 5 shows a configuration that stores N+1 controller pages in a block of N memory pages. Alternatively, processor 44 may store any other suitable number of pages, different than N, in an N-page block by modifying the ECC redundancy level.

In some embodiments, processor 44 decides whether or not to compress the user data prior to storage. The decision may be based, for example, on the type of data and/or wear level of the memory. If the data is compressed, processor 44 can use a relatively high over-provisioning ratio. Otherwise, a lower over-provisioning ratio is typically used. In an example scenario, processor 44 may apply data compression, and a high over-provisioning ratio, at the beginning of the system's lifetime. At a later point in time, processor 44 may store the data without compression, and reduce the over-provisioning ratio accordingly.

Further alternatively, processor 44 may modify the storage configuration used for storing data in the memory in any other suitable manner, in order to clear memory resources and increase the over-provisioning ratio. Example mechanisms for modifying the storage configuration are described, for example, in PCT International Publication WO 2007/132456, whose disclosure is incorporated herein by reference.

Adaptive Over-Provisioning Using
Logical-to-Physical Address Translation

In some embodiments, SSD controller 32 stores data in memory devices 28 using logical-to-physical address mapping. In these embodiments, host 24 exchanges data with the SSD controller by addressing a predefined range of logical addresses. Processor 44 in the SSD controller maintains a mapping between the logical addresses and a certain number of physical storage locations (e.g., physical pages) in the memory blocks of memory devices 28. Processor 44 stores incoming data by mapping the logical addresses to the physical storage locations.

In some embodiments, processor 44 adaptively modifies the over-provisioning overhead by modifying the number of physical storage locations without modifying the range of logical addresses. In a typical implementation, processor 44 initially defines a certain number of physical storage locations, so as to comply with a certain initial over-provisioning overhead. In other words, the initial number of physical storage locations is defined so as to retain a sufficient amount of memory areas that do not contain valid data (including user data, ECC redundancy and/or metadata), as derived from the initial over-provisioning overhead. Initially, the controller stores data and performs garbage collection using this initial logical-to-physical address mapping.

At a later point in time, processor 44 defines a modified over-provisioning overhead that is different from the initial over-provisioning overhead. In order to comply with the modified over-provisioning overhead, the processor modifies (increases or decreases) the number of physical storage locations that are used in the logical-to-physical address mapping. Typically, this modification is performed without modifying the range of logical addresses used between the SSD controller and the host. Processor 44 may modify the number of physical storage locations using any of the techniques described above, e.g., by trading-off ECC redundancy resources, by modifying the storage density (the number of bits/cell), or by performing data compression.

After modifying the number of physical storage locations, processor 44 updates the logical-to-physical address mapping accordingly, so as to comply with the modified over-provisioning overhead. Subsequent data storage and garbage collection are performed using thus updated mapping.

Typically, processor 44 defines and maintains a certain data structure (e.g., one or more tables) for holding the logical-to-physical address mapping. In some embodiments, upon modifying the over-provisioning overhead, processor 44 modifies the size of this data structure accordingly. Processor 44 may employ a logical-to-physical address mapping process that is designed to operate with a variable over-provisioning overhead. This process is typically used for data storage, data retrieval and garbage collection. In particular, such a process may use one or more logical-to-physical mapping tables whose size and/or variable range varies.

Adaptive Over-Provisioning in a SSD Used as Cache Memory

In some embodiments, a non-volatile memory system (e.g., SSD) is used as a cache memory for a long-term storage device (e.g., magnetic disk). The adaptive over-provisioning techniques described herein can be applied in such cache applications, as well. As noted above, adaptive over-provisioning is important in maintaining high storage throughput. In cache memory applications, applying adaptive over-provisioning techniques in the cache memory can increase the storage throughput of the entire storage system.

Figure 6:
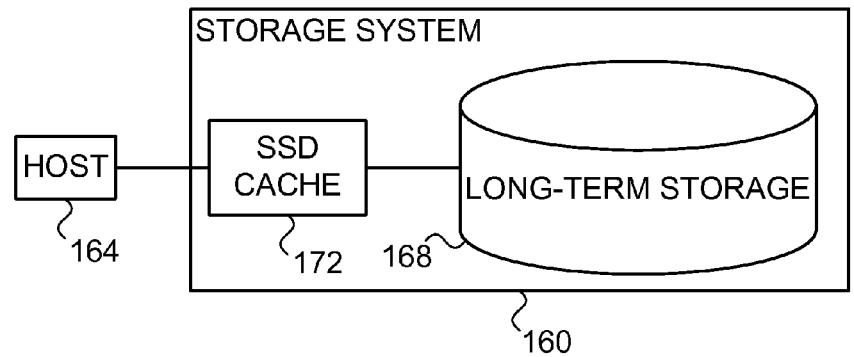
FIG. 6 is a block diagram that schematically illustrates a storage system, in accordance with an alternative embodiment of the present invention.

FIG. 6 is a block diagram that schematically illustrates a storage system 160, in accordance with an alternative embodiment of the present invention. System 160 stores data for a host 164. System 20 comprises a long-term storage device 168, such as a magnetic disk or any other suitable storage device. System 160 further comprises an SSD 172, which temporarily caches data items that are sent from the host for storage in storage device 168. In the present example, SSD 172 operates in a "write through" mode. In this mode, each data item that is received from host 164 is stored in storage device 168 and also cached in SSD 172. SSD 172 may be similar to system 20 of FIG. 1 above. In some embodiments, SSD 172 adaptively modifies the over-provisioning overhead it uses when caching data items. Any of the adaptive over-provisioning schemes described above can be used for this purpose.

In some embodiments, host 164 may request SSD 172 to delete some of the cached data items in order to free cache memory resources. Various storage protocols support "cache trim" commands, and host 164 may use such a command for this purpose. Host 164 may issue a trim command to SSD 172, for example, upon detecting that the storage throughput of system 160 has deteriorated, or upon deciding that higher throughput is desired. In response to a trim command, SSD 172 may delete one or more of the cached data items, and use the released memory space to increase the over-provisioning ratio. The higher over-provisioning overhead helps to improve the storage throughput of SSD 172, and therefore of system 160 as a whole.

Figure 7:
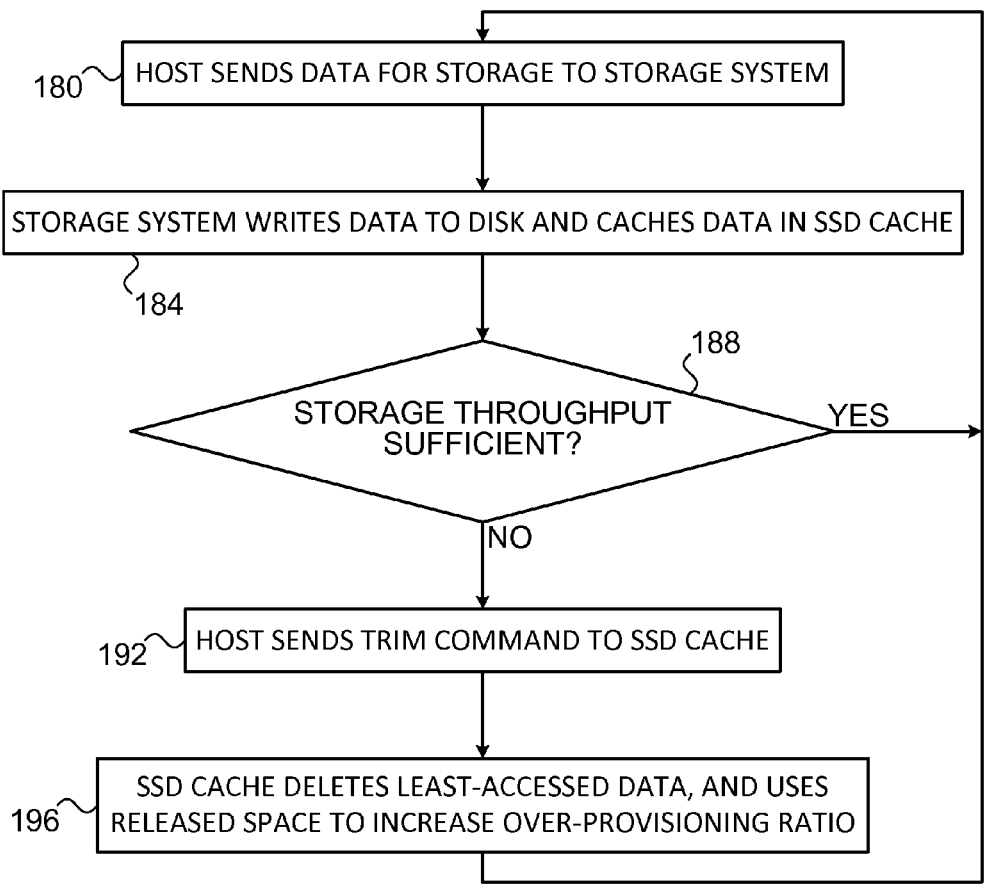
FIG. 7 is a flow chart that schematically illustrates a method for data storage, in accordance with an embodiment of the present invention.

FIG. 7 is a flow chart that schematically illustrates a method for data storage, in accordance with an embodiment of the present invention. The method begins with host 164 sending data items for storage in storage system 160, at a data sending step 180. System 160 caches the data items in SSD 172, and also stores the data items in long-term storage device 168, at a storage and caching step 184. Host 164 checks whether the current storage throughput of system 160 is sufficient, at a throughput checking step 188. If sufficient, the method loops back to step 180 above, and the host continues to send data items for storage.

If, on the other hand, the current storage throughput of system 160 is insufficient, the host sends a "cache trim" command to SSD 172, at a trim requesting step 192. The command requests SSD 172 to free some cache memory resources in order to increase the throughput. In response to the trim command, SSD 172 deletes one or more data items and uses the released memory space to increase the over-provisioning overhead, at an over-provisioning increasing step 196. SSD 172 may select data items for deletion based on any suitable criterion, such as the least-accessed items or the oldest items. The increased over-provisioning overhead increases the storage throughput of SSD 172. The method then loops back to step 180 above.

ADDITIONAL EMBODIMENTS AND VARIATIONS

In some applications, some or all of the data that is provided for storage in system 20 is also backed-up in another storage location. For example, system 20 may be part of a redundant storage system (e.g., Redundant Array of Independent Disks—RAID). As another example, system 20 may comprise a SSD in a mobile computer, which backs-up data to another storage location using a network connection when it is connected to a network.

In some embodiments, SSD controller 32 is notified whether or not certain data is backed-up in another location in addition to system 20. In an example embodiment, host 24 and SSD controller 32 support a command interface, using which the host informs the SSD controller whether a given data item that is sent for storage is backed-up in an additional location. The status of a given data item may change over time. For example, in a mobile computer application, a given data item may be stored exclusively in system 20 while the computer is disconnected from a network (e.g., mobile), and then be backed-up over a network connection when the mobile computer connects to the network. In some embodiments, processor 44 adjusts the over-provisioning overhead based on these notifications.

For example, when the notifications indicate that a given data item is backed-up in another location in addition to system 20, it may be permissible to store this data item in system 20 at reduced storage reliability. Therefore, processor 44 may store the given data item at a denser storage configuration having reduced storage reliability (e.g., using less ECC redundancy and/or using more bits/cell). The extra memory space that is freed by the denser storage configuration can be used to increase the over-provisioning ratio. In some embodiments, SSD controller 32 applies internal RAID in system 20, i.e., stores data items in system 20 using RAID redundancy. When a given data item is known to be backed-up externally to system 20, processor 44 may store this data item without internal RAID redundancy.

In some scenarios, the host informs the SSD controller that a given data item, which was not previously backed-up in another location, is now backed-up. For example, a mobile computer may at some point be connected to a network connection, which enables backup of locally-stored data items to remote storage. Upon receiving such a notification, the SSD controller may change the storage configuration of this data item, and modify the over-provisioning overhead accordingly.

In some embodiments, one or more of memory devices 28 are assigned as spare devices that are not used for normal data storage. If a given memory device 28 fails, it is replaced by one of the spare memory devices. In some embodiments, when a spare device is not used to replace a faulty device, it can be used as an additional over-provisioning area.

Typically, system 20 is specified to provide a certain endurance, e.g., to endure a certain number of programming cycles. Because of the "write amplification" effect described above, the system-level endurance specification translates to a higher endurance requirement from devices 28. When system 20 comprises multiple memory devices 28, the memory devices may differ from one another in their endurance levels, e.g., in the number of programming and erasure cycles they are able to endure. In some cases, the endurance level of each memory device can be estimated or predicted.

In some embodiments, processor 44 individually assigns each memory device 28 a respective range of logical addresses, whose size matches the expected endurance of the memory device. The remaining physical memory space of each memory device is used for over-provisioning. Consider, for example, a system comprising 1 GB memory devices (i.e., the physical storage size of each device is 1 GB). Some of these devices may have high endurance, while others may have poorer endurance, e.g., because of statistical manufacturing process variations among the devices.

In an example embodiment, processor 44 may assign each higher-endurance device a logical address range of 900 MB, and use an over-provisioning ratio of 10% on these devices. For the lower-endurance devices, processor 44 may assign an address range of 800 MB, and use an over-provisioning ratio of 20% on these devices. As a result, a lower-endurance device will need to handle a smaller number of programming cycles relative to a high-endurance device. Assuming a statistical mixture of higher- and lower-endurance devices, the system-level endurance specification can be met without discarding lower-endurance devices. This technique increases manufacturing yield and thus reduces cost.

The description above refers to setting separate, possibly different over-provisioning overheads to different memory devices 28. Alternatively, processor 44 may assign separate, possibly different over-provisioning overheads to any other suitable group of memory cells, e.g., to different planes or different dies within a given memory device 28. The appropriate over-provisioning overhead for each cell group or device can be determined, for example, during manufacturing tests.

The following analysis demonstrates the potential value of assigning different over-provisioning overheads to different memory portions. In many practical cases, the write amplification factor can be approximated by $1/OP$, wherein OP denotes the over-provisioning ratio. Consider an example scenario in which a certain portion $0 < P < 1$ of the memory can endure C1 P/E cycles, and the remaining $1-P$ of the memory can endure $C2 > C1$ cycles. This scenario also assumes purely random (i.e., non-sequential) programming of the memory. Let S denote the logical capacity of the memory.

If both portions of the memory were assigned the same OP, both portions will first perform $C1 \cdot OP \cdot S$, and then P of the blocks will end their life. If $P > OP$, then the entire memory will end its life. Otherwise, the memory will continue operating with an over-provisioning ratio of $OP-P$. Thus, the total amount of data that can be written during memory lifetime is:

$$A = (C1 \cdot OP + MAX\{0, (C2-C1) \cdot (OP-P)\}) \cdot S, \quad [1]$$

wherein S denotes the logical size of the memory.

Consider, on the other hand, an implementation in which the memory portions P and $(1-P)$ are assigned different over-provisioning ratios OP1 and OP2, respectively. OP1 and OP2 are selected such that both portions end their life after approximately the same number of user cycles, i.e.:

$$C1 \cdot OP1 = C2 \cdot OP2. \quad [2]$$

Since only a portion OP of the memory can be used for over-provisioning, $P \cdot OP1 + (1-P) \cdot OP2 \leq OP$. Therefore, if all the over-provisioning area is utilized, we can write:

$$OP2 = (OP - P \cdot OP1)/(1-P) \quad [3]$$

Solving Equations [2] and [3] gives:

$$OP1 = C2 \cdot OP/((1-P)C1 + P \cdot C2)$$

$$OP2 = C1 \cdot OP/((1-P) \cdot C1 + P \cdot C2) \quad [4]$$

The total amount of data that can be written during the lifetime of the memory is thus:

$$A' = C1 \cdot C2/((1-P)C1 + P \cdot C2) \cdot OP \cdot S \quad [5]$$

Consider, for example, two numerical examples where OP=25%. If, for example, C1=20K cycles, C2=50K cycles and P=10%, then A=9500·S and A'=10870·S. If P would be 0 then A' would reach 12500·S. As can be seen, A' is considerably greater than A, meaning that assigning over-provisioning overheads separately to different memory portions based on endurance can potentially increase the total endurance of the memory.

As another example, if C1=30K cycles, C2=50K cycles and P=10%, then A=7500·S and A'=9375·S, i.e., a 25% improvement. Using SLC storage in portion P of the memory can only improve the endurance by a factor of less than $1/(1-P)$, even if the SLC has infinite endurance: If, for example, C1=50K cycles, C2=1000K cycles and P=90%, then A=12500·S and A'=12500·S/0.9. For cases where P<OP, A' may be lower than A. For example, if C1=10 cycles, C2=50K cycles and P=0.01, then A=12000·S and A'=250·S.

The above analysis can be generalized to an implementation in which n memory segments whose relative sizes are denoted P1 . . . Pn and whose endurances are denoted C1 . . . Cn. Again, the write amplification factor is approximated by 1/OP. The n segments are assigned over-provisioning ratios denoted OP1 . . . OPn, which are selected such that all n segments end their life approximately after the same number of user cycles:

$$Ci \cdot OPi = K, i = 1 \ldots n \quad [6]$$

wherein K is a constant. If OP denotes the overall over-provisioning ratio of the entire memory, we are limited by the constraint:

$$\Sigma_{i=1 \ldots n} Pi \cdot OPi = OP \quad [7]$$

From solving Equations [6] and [7] we can approximate that the total amount of data that can be written over the lifetime of the memory is $$A'' = C'' \cdot OP \cdot S \quad [8]$$

wherein S denotes the logical size of the memory, and C" denotes the harmonic average of the endurances of the segments of the SSD:

$$C'' = 1/\Sigma_{i=1 \ldots n}(Pi/Ci). \quad [9]$$

Consider, for example, a memory in which 50% of the blocks can endure 20K cycles and 50% can endure 50K cycles. By appropriate allocation of over-provisioning ratios to the different blocks, the memory can achieve an effective endurance of C"=1/(0.5/20000+0.5/50000)=28570 cycles, instead of 20000 cycles using conventional schemes and even wear leveling.

In some embodiments, processor 44 selects blocks for garbage collection and erasure based on their estimated endurance. Thus, for example, blocks that are estimated to have long endurance will be compacted and erased when they contain a certain number of invalid pages (e.g., ten pages), whereas blocks that are estimated to have short endurance will be compacted and erased only when they reach a higher number of invalid pages (e.g., twenty pages).

In some embodiments, e.g., in a SSD application, memory devices 28 are grouped in two or more groups that are referred to as channels. Upon receiving a given data item for storage, processor 44 selects one of the channels, and sends the data item for storage in the selected channel. In some embodiments, processor 44 assigns a respective over-provisioning ratio individually for each channel. The over-provisioning ratio may differ from one channel to another. The processor selects a channel for storing a given data item based on the over-provisioning ratios. For example, processor may send an incoming data item for storage in the channel that currently has the highest over-provisioning overhead among all the channels.

In some embodiments, each memory device 28 (or each die within each memory device) is assigned a respective sub-range of logical addresses. In the event that a given device fails, processor 44 may re-map the logical addresses to devices 28, so as to divide the overall range of logical addresses among the remaining functional devices. When re-mapping the logical addresses, processor reduces the over-provisioning ratio slightly. As a result, the system can remain operational without re-formatting. The re-mapping and over-provisioning reduction process can be performed gradually, e.g., for subsequent write operations.

In some embodiments, processor 44 stores some of the data in memory devices 28 at a certain storage density (e.g., SLC) and some of the data at a different storage density (e.g., MLC). In particular, processor 44 may store frequently-changed data ("hot data") at a certain high-endurance and high-speed storage configuration (e.g., SLC), and rarely-changed data ("cold data") at a lower-endurance and lower-speed but lower-cost storage configuration (e.g., MLC). In some embodiments, processor 44 may change the relative portion of the data that is stored using the first storage density changes over time. For example, the proportion between the volumes of "hot" and "cold" data may change over time.

In an embodiment, processor 44 reacts to such a change by modifying the memory spaces that are allocated to the two storage densities (e.g., increase the SLC space at the expense of MLC space, or vice versa). As a result of this modification, the ratio between the physical capacity of the memory and the user capacity of the memory changes, as well. For example, allocating more memory to SLC storage and less memory to MLC storage reduces the physical capacity of the memory, and vice versa. Therefore, changing the relative memory allocation to the different storage densities changes the over-provisioning ratio of the system.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for data storage, comprising:

in a memory that includes multiple memory blocks, specifying at a first time a first over-provisioning overhead, and storing data in the memory while retaining in the memory blocks memory areas, which do not hold valid data and whose aggregate size is at least commensurate in size with the specified first over-provisioning overhead;

compacting portions of the data from one or more previously-programmed memory blocks containing one or more of the retained memory areas; and at a second time subsequent to the first time, specifying a second over-provisioning overhead that is different from the first over-provisioning overhead, and continuing to store the data and compact the data portions while complying with the second overprovisioning overhead;

wherein storing the data at the first time comprises encoding the data with an Error Correction Code (ECC) having a given redundancy level and storing the encoded data, and wherein specifying the second over-provisioning overhead comprises modifying the given redundancy level of the ECC.

2. The method according to claim 1, wherein storing the data at the first time comprises encoding the data with an Error Detection Code (EDC) having a given size and storing the encoded data, and wherein specifying the second over-provisioning overhead comprises modifying the given size of the EDC.

3. The method according to claim 1, wherein each memory block comprises multiple memory cells, wherein storing the data at the first time comprises programming the data at a given number of bits per cell, and wherein specifying the second over-provisioning overhead comprises modifying the given number of bits per cell.

4. The method according to claim 3, wherein modifying the given number of bits per cell comprises modifying a number of programming levels that are used for programming the memory cells.

5. The method according to claim 3, wherein modifying the given number of bits per cell comprises modifying a coding rate of an Error Correction Code (ECC) that is used for encoding the data.

6. The method according to claim 1, wherein storing the data at the first time comprises storing N pages in a given memory block, and wherein continuing to store the data at the second time comprises storing M pages in the given block, M≠N.

7. The method according to claim 1, wherein specifying the first and second over-provisioning overheads comprises compressing the data and storing the compressed data at one of the first and second times, and storing the data without compression at the other of the first and second times.

8. The method according to claim 1, wherein specifying the second over-provisioning overhead comprises evaluating a predefined adaptation criterion with respect to at least some of the memory blocks, and setting the second over-provisioning overhead responsively to meeting the adaptation criterion.

9. The method according to claim 8, wherein evaluating the adaptation criterion comprises assessing a wear level of the at least some of the memory blocks.

10. The method according to claim 8, wherein evaluating the adaptation criterion comprises assessing an expected number of errors in the at least some of the memory blocks.

11. The method according to claim 8, wherein evaluating the adaptation criterion comprises assessing a target storage reliability of the data in the at least some of the memory blocks.

12. The method according to claim 8, wherein the adaptation criterion depends on a preference between programming speed and a capacity of the memory.

13. The method according to claim 8, wherein the adaptation criterion depends on a frequency at which the data in the at least some of the memory blocks changes.

14. The method according to claim 1, wherein storing the data comprises accepting the data from a host for storage in a long-term storage device, and temporarily caching the data in the memory.

15. The method according to claim 14, wherein specifying the second over-provisioning overhead comprises receiving from the host a request to free cache memory resources, and setting the second over-provisioning overhead in response to the request.

16. The method according to claim 1, wherein the data is received from a host for storage in the memory, wherein the memory has a specified user capacity that is available to the host, and wherein specifying the second over-provisioning overhead does not change the specified user capacity.

17. The method according to claim 1, wherein specifying the second over-provisioning overhead comprises accepting an indication whether a data item that is stored in the memory is also stored in an additional storage location, and setting the second over-provisioning overhead responsively to the indication.

18. The method according to claim 1, wherein the memory includes multiple memory devices each holding a subset of the memory blocks, and wherein specifying the first and second over-provisioning overheads comprise assigning one of the memory devices to serve as a spare memory device for replacing a faulty memory device, and, until the spare memory device replaces the faulty memory device, using the spare memory device to increase the first overprovisioning overhead.

19. The method according to claim 1, wherein the memory includes multiple memory portions each holding a subset of the memory blocks, and wherein specifying the first over-provisioning overhead comprises individually specifying respective values of the first overprovisioning overhead separately for the memory portions.

20. The method according to claim 19, wherein specifying the respective values of the over-provisioning overhead comprises setting a respective value of the first over-provisioning overhead for a given memory portion based on an expected endurance of the given memory portion.

21. The method according to claim 1, wherein the memory includes multiple memory devices each holding a subset of the memory blocks, wherein specifying the first over-provisioning overhead at the first time comprises assigning each memory device a respective range of logical addresses, and wherein specifying the second over-provisioning overhead at the second time comprises re-assigning the logical addresses among the memory devices in response to a failure of a given memory device.

22. The method according to claim 1, wherein the memory includes multiple memory devices that are grouped in two or more groups, wherein specifying the first overprovisioning ratio comprises individually specifying respective values of the first over-provisioning overhead for the groups, and comprising selecting, responsively to the values, one of the groups for storing an input data item, and storing the input data item in the selected group.

23. The method according to claim 1, wherein storing the data at the first time comprises storing a first portion of the data at a first storage density and a second portion of the data at a second storage density that is different from the first storage density, and wherein specifying the second over-provisioning ratio comprises, at the second time, modifying a ratio between the first and second portions of the data.

24. The method according to claim 23, wherein storing the data comprises storing frequently-changing data at the first storage density, and rarely-changing data at the second storage density.

25. The method according to claim 1, wherein compacting the portions of the data comprises selecting the previously-programmed memory blocks for compaction based on an estimated endurance of the blocks.

26. A method for data storage, comprising:
   in a memory that includes multiple memory blocks, pre-defining a range of logical addresses for storing data in the memory;
   defining a number of physical storage locations in the memory blocks, such that data storage in the number of the physical storage locations retains in the memory blocks memory areas that do not hold valid data and whose aggregated size is at least commensurate in size with an initial over-provisioning overhead;
   at a first time, storing the data in the memory by mapping the logical addresses to the number of physical storage locations, while complying with the initial over-provisioning overhead, and compacting portions of the data from one or more previously-programmed memory blocks containing one or more of the retained memory areas; and
   at a second time subsequent to the first time, defining a modified over-provisioning overhead that is different from the initial over-provisioning overhead, modifying the number of the physical storage locations so as to comply with the modified over-provisioning overhead, and continuing to store the data by mapping the logical addresses to the modified number of the physical storage locations and compacting the data portions;
   wherein defining and modifying the number of physical storage locations comprise applying a mapping process, which maps between the logical addresses and the physical storage locations and which varies in accordance with the over-provisioning overhead.

27. The method according to claim 26, wherein applying the mapping process comprises defining a data structure for holding a mapping between the logical addresses and the physical storage locations, and modifying at least one of a size of the data structure and a variable range of data structure in accordance with the over-provisioning overhead.

28. Apparatus for data storage, comprising:
   a memory, comprising multiple memory blocks; and
   a processor, which is configured to specify at a first time a first over-provisioning overhead and store data in the memory while retaining in the memory blocks memory areas, which do not hold valid data and whose aggregated size is at least commensurate in size with the specified first over-provisioning overhead, to compact portions of the data from one or more previously-programmed memory blocks containing one or more of the retained memory areas, and, at a second time subsequent to the first time, to specify a second over-provisioning overhead that is different from the first over-provisioning overhead and to continue to store the data and compact the data portions while complying with the second over-provisioning overhead;

wherein the processor is configured to encode the data at the first time with an Error Correction Code (ECC) having a given redundancy level and store the encoded data, and to specify the second over-provisioning overhead by modifying the given redundancy level of the ECC.

29. The apparatus according to claim 28, wherein the processor is configured to encode the data at the first time with an Error Detection Code (EDC) having a given size and store the encoded data, and to specify the second over-provisioning overhead by modifying the given size of the EDC.

30. The apparatus according to claim 28, wherein each memory block comprises multiple memory cells, and wherein the processor is configured to program the data at the first time at a given number of bits per cell, and to specify the second over-provisioning overhead by modifying the given number of bits per cell.

31. The apparatus according to claim 30, wherein the processor is configured to modify the given number of bits per cell by modifying a number of programming levels that are used for programming the memory cells.

32. The apparatus according to claim 30, wherein the processor is configured to modify the given number of bits per cell by modifying a coding rate of an Error Correction Code (ECC) that is used for encoding the data.

33. The apparatus according to claim 28, wherein the processor is configured to store the data at the first time by storing N pages per memory block, and to continue to store the data at the second time by storing M pages per memory block, M≠N.

34. The apparatus according to claim 28, wherein the processor is configured to specify the first and second over-provisioning overheads by compressing the data and storing the compressed data at one of the first and second times, and storing the data without compression at the other of the first and second times.

35. The apparatus according to claim 28, wherein the processor is configured to evaluate a predefined adaptation criterion with respect to at least some of the memory blocks, and to set the second over-provisioning overhead responsively to meeting the adaptation criterion.

36. The apparatus according to claim 35, wherein the processor is configured to evaluate the adaptation criterion by assessing a wear level of the at least some of the memory blocks.

37. The apparatus according to claim 35, wherein the processor is configured to evaluate the adaptation criterion by assessing an expected number of errors in the at least some of the memory blocks.

38. The apparatus according to claim 35, wherein the processor is configured to evaluate the adaptation criterion by assessing a target storage reliability of the data in the at least some of the memory blocks.

39. The apparatus according to claim 35, wherein the adaptation criterion depends on a preference between programming speed and a capacity of the memory.

40. The apparatus according to claim 35, wherein the adaptation criterion depends on a frequency at which the data in the at least some of the memory blocks changes.

41. The apparatus according to claim 28, wherein the processor is configured to accept the data from a host for storage in a long-term storage device, and to temporarily cache the data in the memory.

42. The apparatus according to claim 41, wherein the processor is configured to receive from the host a request to free cache memory resources, and to specify the second over-provisioning overhead in response to the request.

43. The apparatus according to claim 28, wherein the data is received from a host for storage in the memory, wherein the memory has a specified user capacity that is available to the host, and wherein setting of the second over-provisioning overhead does not change the specified user capacity.

44. The apparatus according to claim 28, wherein the processor is configured to accept an indication whether a data item that is stored in the memory is also stored in an additional storage location, and to set the second over-provisioning overhead responsively to the indication.

45. The apparatus according to claim 28, wherein the memory comprises multiple memory devices each holding a subset of the memory blocks, and wherein the processor is configured to assign one of the memory devices to serve as a spare memory device for replacing a faulty memory device, and, until the spare memory device replaces the faulty memory device, to use the spare memory device to increase the first over-provisioning overhead.

46. The apparatus according to claim 28, wherein the memory comprises multiple memory portions each holding a subset of the memory blocks, and wherein the processor is configured to individually specify respective values of the first over-provisioning overhead separately for the memory portions.

47. The apparatus according to claim 46, wherein the processor is configured to set a respective value of the first over-provisioning overhead for a given memory portion based on an expected endurance of the given memory portion.

48. The apparatus according to claim 28, wherein the memory comprises multiple memory devices each holding a subset of the memory blocks, and wherein the processor is configured to assign each memory device a respective range of logical addresses at the first time, and to reassign the logical addresses among the memory devices at the second time in response to a failure of a given memory device.

49. The apparatus according to claim 28, wherein the memory comprises multiple memory devices that are grouped in two or more groups, and wherein the processor is configured to individually specify respective values of the first over-provisioning overhead for the groups, to select, responsively to the values, one of the groups for storing an input data item, and to store the input data item in the selected group.

50. The apparatus according to claim 28, wherein the processor is configured to store the data at the first time by storing a first portion of the data at a first storage density and a second portion of the data at a second storage density that is different from the first storage density, and to modify a ratio between the first and second portions of the data at the second time, so as to specify the second over-provisioning ratio.

51. The apparatus according to claim 50, wherein the processor is configured to store frequently-changing data at the first storage density, and rarely-changing data at the second storage density.

52. The apparatus according to claim 28, wherein the processor is configured to select the previously-programmed memory blocks for compaction based on an estimated endurance of the blocks.

53. Apparatus for data storage, comprising:
a memory, comprising multiple memory blocks; and
a processor, which is configured to predefine a range of logical addresses for storing data in the memory, to define a number of physical storage locations in the memory blocks, such that data storage in the number of the physical storage locations retains in the memory blocks memory areas that do not hold valid data and whose aggregated size is at least commensurate in size with an initial over-provisioning overhead, to store data in the memory at a first time by mapping the logical addresses to the number of the physical storage locations, while complying with the initial overprovisioning overhead, and compacting portions of the data from one or more previously-programmed memory blocks containing one or more of the retained memory areas, and, at a second time subsequent to the first time, to define a modified over-provisioning overhead that is different from the initial over-provisioning overhead, to modify the number of the physical storage locations so as to comply with the modified over-provisioning overhead, and to continue to store the data by mapping the logical addresses to the modified number of the physical storage locations and compact the data portions;

wherein the processor is configured to apply a mapping process, which maps between the logical addresses and the physical storage locations and which varies in accordance with the over-provisioning overhead.

54. The apparatus according to claim 53, wherein the processor is configured to define a data structure for holding a mapping between the logical addresses and the physical storage locations, and to modify at least one of a size of the data structure and a variable range of the data structure in accordance with the over-provisioning overhead.

* * * * *